United States Patent [19]

Tsumura

[11] Patent Number: 4,954,969
[45] Date of Patent: Sep. 4, 1990

[54] SYSTEM FOR PROCESSING VARIOUS TYPES OF INFORMATION IN EASILY USABLE FORM

[75] Inventor: Tomoki Tsumura, Yokohama, Japan

[73] Assignee: PFU Limited, Ishikawa, Japan

[21] Appl. No.: 134,972

[22] Filed: Dec. 18, 1987

[30] Foreign Application Priority Data

| Dec. 19, 1986 | [JP] | Japan | 61-303471 |
| Dec. 26, 1986 | [JP] | Japan | 61-313155 |
| Dec. 26, 1986 | [JP] | Japan | 61-313156 |
| Dec. 26, 1986 | [JP] | Japan | 61-313157 |
| Dec. 26, 1986 | [JP] | Japan | 61-313158 |
| Dec. 26, 1986 | [JP] | Japan | 313159159 |
| Dec. 26, 1986 | [JP] | Japan | 313160160 |
| Dec. 26, 1986 | [JP] | Japan | 313161161 |
| Dec. 26, 1986 | [JP] | Japan | 313162162 |

[51] Int. Cl.$^5$ ............................................. G06F 15/20
[52] U.S. Cl. .................................... 364/521; 340/723; 340/799
[58] Field of Search ................ 364/518–522; 358/903; 340/711, 712, 723, 724, 734, 798, 799

[56] References Cited

U.S. PATENT DOCUMENTS

| 4,484,302 | 11/1984 | Cason et al. | 364/521 X |
| 4,567,480 | 1/1986 | Blanchard | 340/712 |
| 4,569,019 | 2/1986 | DiOrio et al. | 364/521 X |
| 4,755,810 | 7/1988 | Knierim | 340/799 |
| 4,775,858 | 10/1988 | Stapleton et al. | 340/723 X |

Primary Examiner—Gary V. Harkcom
Assistant Examiner—H. R. Herndon
Attorney, Agent, or Firm—Staas & Halsey

[57] ABSTRACT

An image information processing system includes an image data input portion, an image data-base portion, a high-speed image data-base portion, a buffer memory, and an image data output portion. The image data-base portion stores highly compressed data; the high-speed image data-base portion stores high-speed compressable data; and the buffer memory stores data for a current output. The image data-base portion, the high-speed image data-base portion and the buffer memory are given a hierarchical structure. The image information processing system includes any combination of data for area blocking, a unit for stacking, a unit for adding sound information, and a unit for linking data.

32 Claims, 25 Drawing Sheets

Fig. 18  SOUND REPRODUCTION

LINKAGE DEFINITION

LINKAGE DATA DISPLAY

SYSTEM FOR PROCESSING VARIOUS TYPES OF INFORMATION IN EASILY USABLE FORM

BACKGROUND OF THE INVENTION

1. Field of the Invention

The present invention relates to a data processing system. More particularly, it relates to a system for processing a variety of information, such as character data, picture data and sound data, in an easily usable form.

2. Description of the Related Art

A variety of data processing systems are known, and these data processing systems mainly handle code-data at a high speed; although some data processing systems handle small image data individually and at a low speed. Recently, however, there has been a demand for an information processing system which can handle a large amount of inter-related image data at a high speed.

SUMMARY OF THE INVENTION

An object of the present invention is to provide an image information processing system capable of handling a diversity of image information, such as character data, picture data and sound data, and any mix of the picture data and/or the sound data, in an easily usable form.

Another object of the present invention is to provide an image processing system which performs the above processing at a high speed and with a low cost.

According to the present invention, there is provided an image information processing system including: a portion for inputting image data; an image data-base portion, operatively connected to the data inputting portion, for highly compressing data from the data inputting portion and storing highly compressed image data; a high-speed image data-base portion, operatively connected to the image data-base portion, for storing data therein from the image data-base portion in a high-speed compressable form; a buffer memory 8, operatively connected to the image data-base and the high-speed image data-base, for storing currently handleable data; a portion, operatively connected to the image data-base portion, the high-speed image data-base portion, and the buffer memory, for inputting a request and outputting data in response to the request; and a unit for blocking an area of display on a display unit and for producing picture data including image data, mask data and control data in response to the blocked area.

The area blocking may be carried out by enclosing an area on the display unit through a touch panel.

The size of the mask data may be reduced at a predetermined rate.

The image information processing system may further include a unit for stacking picture data from the display unit into the buffer memory or removing the stacked picture data in response to a request. The stacking unit may include a unit for feeding picture data to be stacked, or removed from the stack, sequentially. The stacking unit may include a unit for adding a tag to or removing a tag from the stacked picture data. The tagging unit may include a unit for searching for tagged picture data. The stacking unit may include a secondary stack storage portion for storing picture data removed from the stack which is frequently used in the stack.

The image information processing system may include a unit for adding sound information in connection with the displayed pictured data and a designated position displayed on the display unit, the sound information including a sound mark to be displayed and sound. The sound adding unit may include a sound input unit operatively connected to the image data-base portion. The position designation may be carried out by designating a position on the display unit through the touch panel. The sound adding unit may also include a unit for adding a protection code to the sound information for preventing an illegal request for an output of the sound. The sound adding unit may further include a unit for outputting the added sound information in connection with the displayed picture data, the outputting including a display of the sound mark at the designated point and an output of the sound. The sound adding unit may inhibit the output of the added sound information when a request for such an output is illegal. The sound adding unit may include a sound output unit.

The image information processing system may further include a unit for linking between the image data in a same group including a plurality of the image data, between the image data in different groups, between the blocked areas in the image date in a same group, between the blocked areas in different groups, and between the blocked area and the image data in a same group or different groups, in response to a request. The blocked area is defined by image data.

The linking unit may include a unit for adding a secret code to dependent linking data. The linking unit may also include a unit for outputting the dependent linking data in connection with display data which is a source of the dependent linking data. The linking output unit may prohibit output of the dependent linking data when the recorded secret code does not coincide with a request secret code input thereto.

The image information processing system may include a key including a display portion for displaying an auxiliary message used to request the operation and an input key portion including mode selection keys, control keys, ten keys, and demand keys which are used to input data demanding the operation.

The image data-base portion, the high-speed image data-base portion and the buffer memory have a hierarchial structure. The image data-base portion may include a low speed and large capacity memory device; the high-speed image-data portion may include a middle speed and middle capacity memory device; and the buffer memory may include a high-speed and small capacity memory device.

The image data-base portion may store highly compressed data; the high-speed image data-base portion may store high-speed compressable data needed in response to a request among the data in the image data-base portion; and the buffer memory may store data to be output, among the data in the high-speed image data-base portion. The image data-base portion may include an optical disc memory system; the high-speed image data-base portion may comprise a magnetic disc memory system; and the buffer memory may include a RAM.

According to the present invention, there is also provided a method for processing various image information in a usable form, as described above.

BRIEF DESCRIPTION OF THE DRAWINGS

Other objects and features of the present invention will be described below in detail with reference to the accompanying drawings, in which.

DESCRIPTION OF THE PREFERRED EMBODIMENTS

Figure 1:
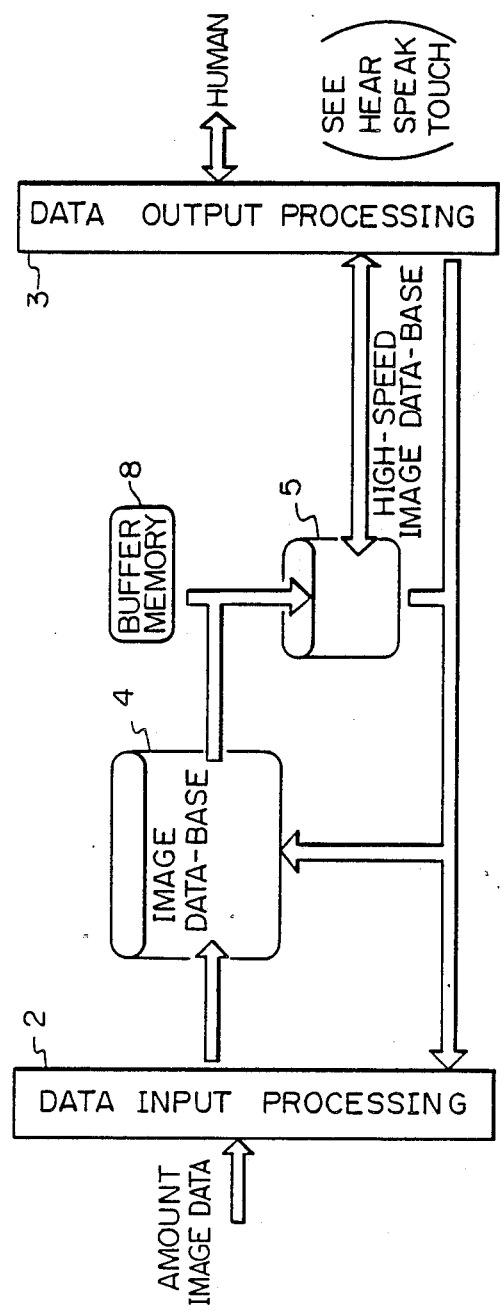
FIG. 1 is a system diagram of a first embodiment of an image data processing system in accordance with the present invention.

FIG. 1 is a system diagram of a first embodiment of an image data (information) processing system in accordance with the present invention. The image data processing system 1 includes an input data processing portion 2, an image data-base portion 4, a high-speed image data-base portion 5, and an output data processing portion 3. The image data processing system 1 utilizes an easily usable image data-base in the image data-base portion 4, and outputs easily handleable image data in connection with a plurality of image data at a high-speed from the high-speed image data-base portion 5. The input data processing portion 2, inputs image information, such as character data, picture data, and sound (audio) data, converts the input image information to data usable for an "intelligent environment support", and adjusts, connects and/or combines the image information to produce new intelligent information data, for example, data combined with the input data. The output data processing portion 3 outputs high speed image information in a desired form, provides an improved interactive image man-machine-interface, and rearranges and re-inputs the output image information.

In this description, the term "image information" or "image data" involves all information such as picture data, character data, and sound (audio) data.

Figure 2:
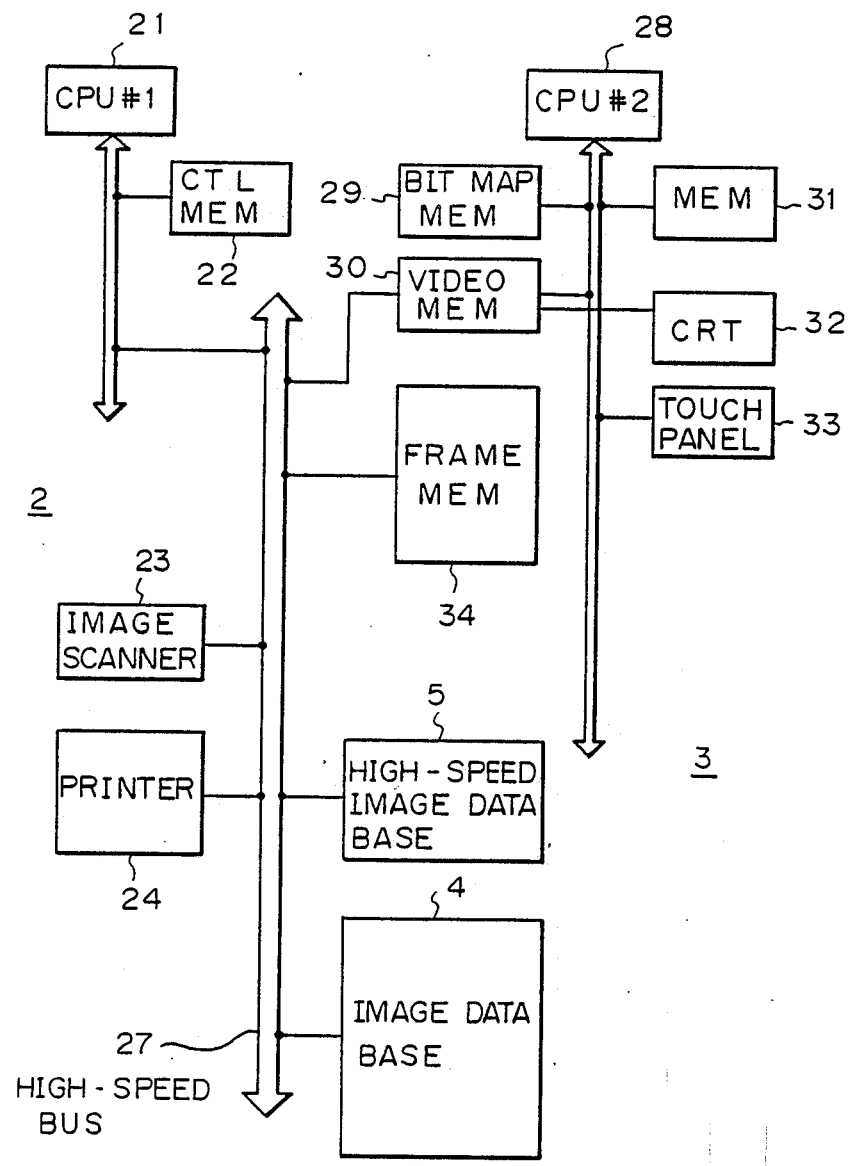
FIG. 2 is a block diagram of the image data processing system shown in FIG. 1.

FIG. 2 is a block diagram of the image information processing system shown in FIG. 1. In FIG. 2, reference 21 denotes a central processor unit (CPU) for controlling the entire image information processing system, 22 a control memory storing control programs for controlling the entire image information processing system, 23 an image scanner for reading image information, 24 an image printer for printing out the image information, and 27 a high-speed bus for transferring a large amount of image data at a high speed. The above components form the input data processing portion 2. Reference 28 denotes another CPU for controlling a display system forming the output data processing portion 3, 29 a bit map memory for processing the image information bit-by-bit, 30 a video memory for storing data to be displayed on a CRT 32, 31 a memory used for the CPU 28, and 33 a touch panel mounted on the CRT 32 and used for inputting position data by touching a finger thereto. Reference 34 denotes a frame memory for storing the image information from the image data-base portion 4, and outputting a desired frame image data to the video memory 30 when a display is requested. The image data-base portion 4 can be realized by an optical disc memory system. The high-speed image data-base portion 5 functions as a frame file memory.

The operation will be described with reference to FIGS. 3 and 4.

S001 to S003

Figure 3:
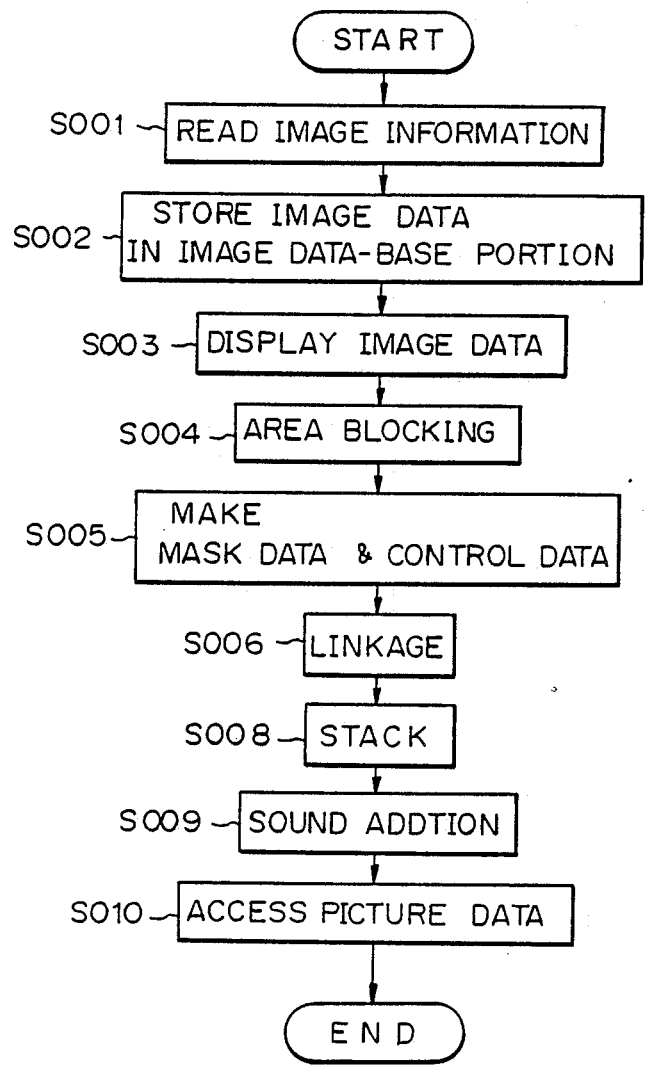
FIG. 3 is a flow chart explaining the operation of the image data processing system shown in FIG. 1.
Figure 4:
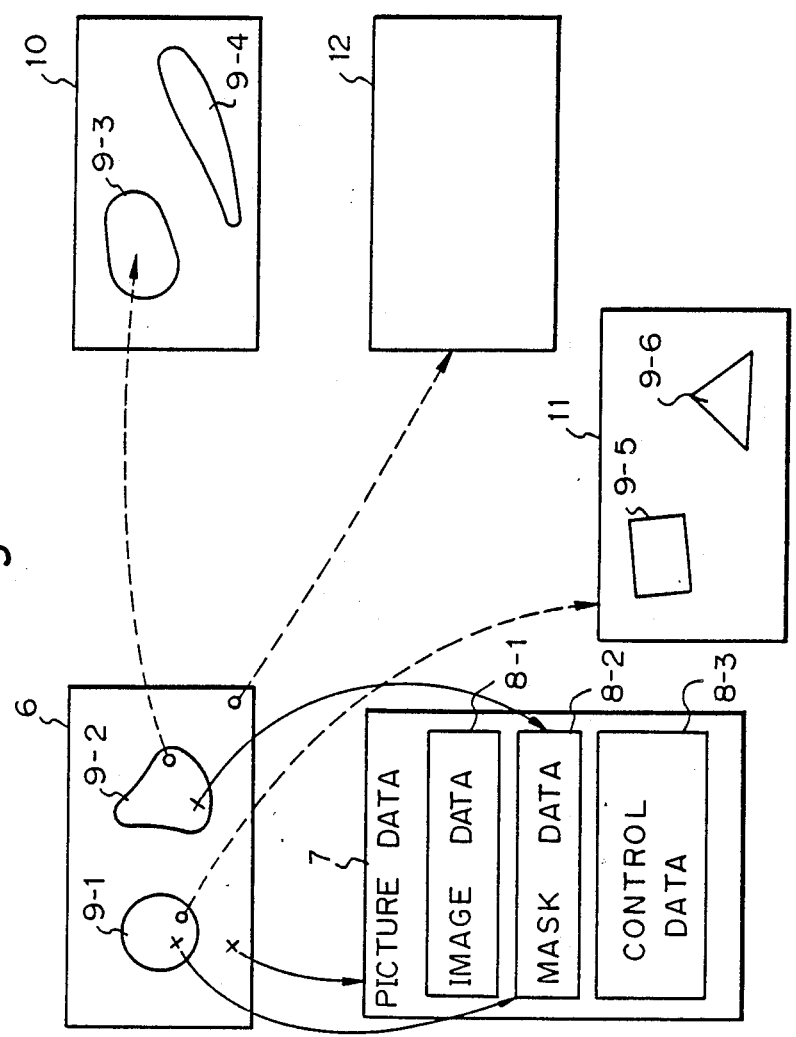
FIG. 4 is a conceptual diagram explaining an area blocking and linkage realized in the image data processing system shown in FIG. 1.

Each image data 6, 10, 11, and 12 shown in FIG. 4 is read by the image scanner 23 of FIG. 2 and stored in the image data-base portion 4 as image data 8-1 forming a picture information 7 (steps S001 and S002 in FIG. 3). Also, the image data is transferred to the video memory 30 through the high-speed bus 27 and displayed on the CRT 32 (S003).

S004

A user encloses image information blocks on the CRT 32 as shown by, for example, blocks 9-1 and 9-2 through the touch panel 33 of FIG. 2, and defines areas of the image information. This operation is defined as "area blocking".

S005

In response to the area blocking, the blocked positions are detected through the touch panel 33, and area information is produced in the bit memory 29 of FIG. 2. This area information is used for picking up block information, and thus is called area mask information, and stored as mask data 8-2 forming a part of the picture data 7, FIG. 4. At the same time, control data 8-3 is produced. The control data 8-3 also forms a part of the picture data 7 and is used for controlling the image data 8-1 and the mask data 8-2. The control data 8-3 concerning the image data may include the following items:

a1. title, data, producer (or user)

a2. storage address of the image data 8-1 in binary form,
a3. storage address of the blocked areas and other connected image data, such as linkage data,
a4. retrieval key words,
a5. protection code, etc.

Also, the control data concerning the blocked area may include the following items:
b1. the number of the area,
b2. storage address of the mask data 8-3 concerning the blocked area,
b3. category (or classification) data, such as texts, charts, characters, drawings in the blocked area,
b4. blocked area protection data,
b5. storage address of the blocked area and other concerning image data, for example, linkage data,
b6. blocked area motion, etc.

S006

If desired, a link can be made as shown in FIG. 4, i.e., between the area 9-1 in the image data 6 and the image data 11; between the area 9-2 in the image data 6 and the area 9-3 in the image data 10, and between the image data 6 and the image data 12, etc. The linkage data is stored in the control data 8-3.

The link can be applied as follows: when the image data 6 is displayed on the CRT 32 and the user touches the area 9-1, the linked image data 11 can be displayed on the CRT 32 as a next display. When the user touches the area 9-2 while displaying the image data 6, the linked image data 10 can be displayed and the area 9-3 can be flickered. When the user touches an area outside of the areas 9-1 and 9-2 while displaying the image data 6, the linked image data 12 can be displayed.

In this example, the linkage area 9-1 is called source linked data, and the image data 11 is called depended linked data. Also, the linkage area 9-2 is called source linked data, and the area 9-3 is called depended linked data, and so on.

The link will be described later in more detail, in connection with a specific example.

S008

Optionally, a stack can be made. The stack will be described later with reference to a specific example.

S009

Also, a sound addition can be made. The sound addition will be described later.

S010

After production of the picture data 7, the user can access the picture data 7 in a variety of modes. This access will be described later.

Figure 5:
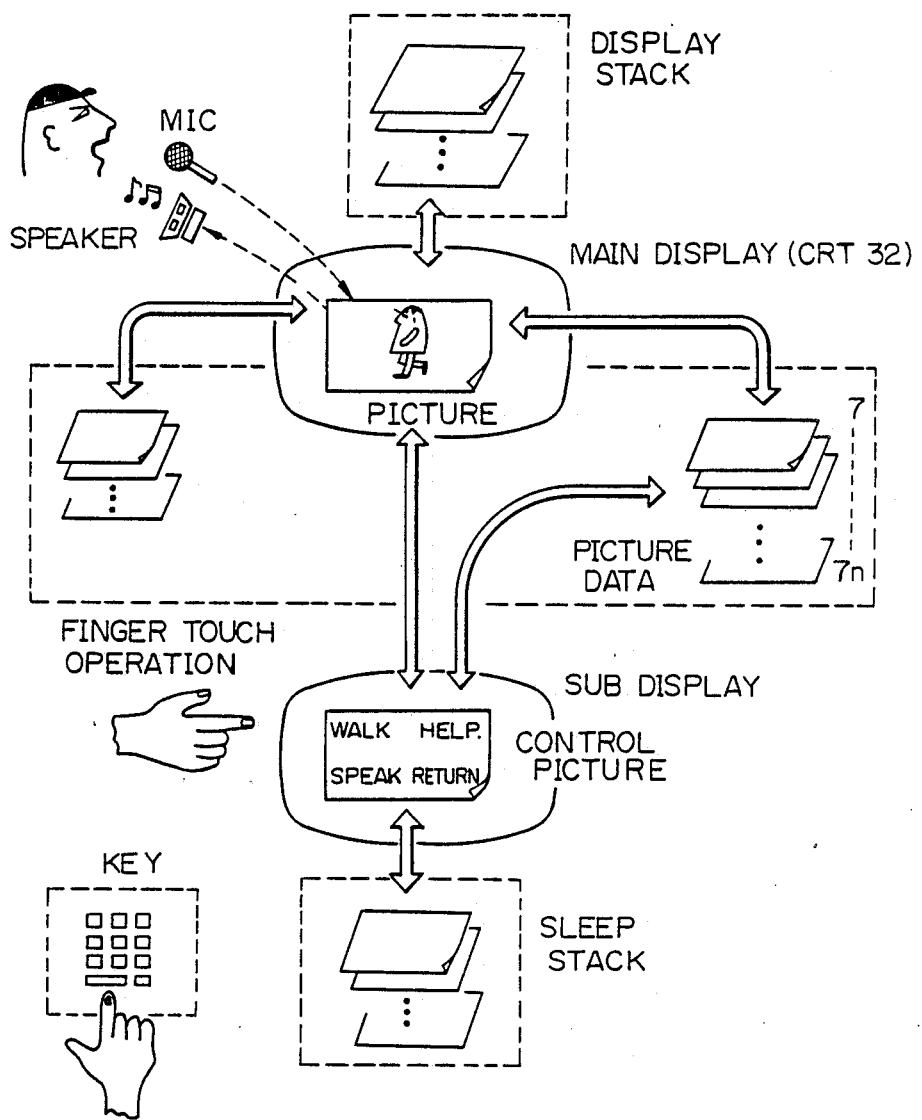
FIG. 5 is a view explaining a flow of picture data in the image data processing system shown in FIG. 1.

FIG. 5 shows a flow of the picture data. In FIG. 5, MAIN DISPLAY corresponds to the CRT 32 of FIG. 2. PICTURE DATA shows a plurality of the picture data 7 which are linked and integrated with each other and are displayed on the CRT 32. A SUB DISPLAY is located on a control panel which will be described later with reference to FIG. 22. The SUB DISPLAY controls the image information processing system 1 of FIG. 1 and is used for displaying control guidance by characters. A KEY is also provided on the control panel. A DISPLAY STACK and a SLEEP STACK can be stored in the frame memory 34 of FIG. 2. The DISPLAY STACK and the SLEEP STACK are temporarily stored for various image processings.

Figure 6:
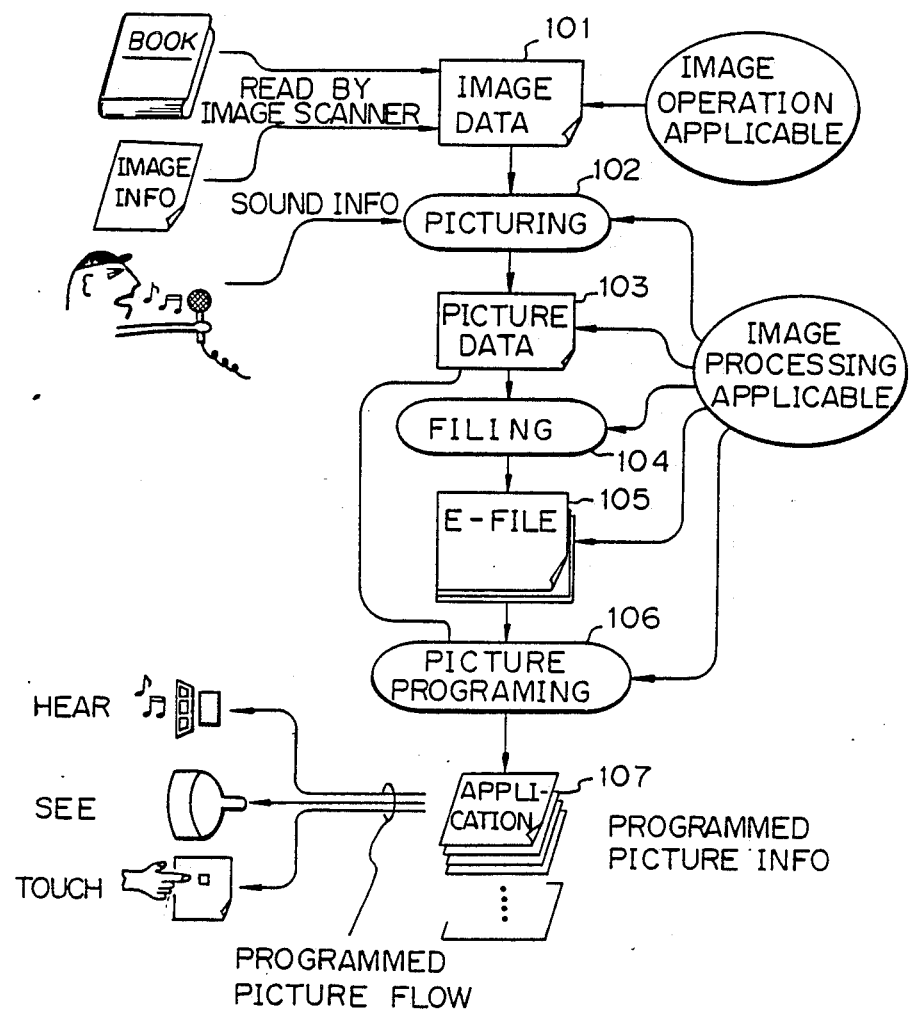
FIG. 6 is a view explaining a mode of use of data in the image data processing system shown in FIG. 1.

FIG. 6 shows a mode of use of the data in the image data processing system 1. An image data 101 is produced by the image scanner 23 of FIG. 2. The image data 101 can be subjected to an image transform, such as rotation, enlargement, reduction, etc. Sound information can be added to the image data 101 by a picturing process 102, producing picture data 103. The picture data 7 of FIG. 4 can be linked as set forth at step S006 by a filing step 104. The linked picture data is stored as an electronic file 105. By employing a picture programming 106, contents in the electronic file 105 and the picture data 103 are used to produce a programmed picture information 107 applicable to respective requirements. The programmed picture information 107 can be displayed on the MAIN DISPLAY in FIG. 5, i.e., on the CRT 32.

Figure 7A:
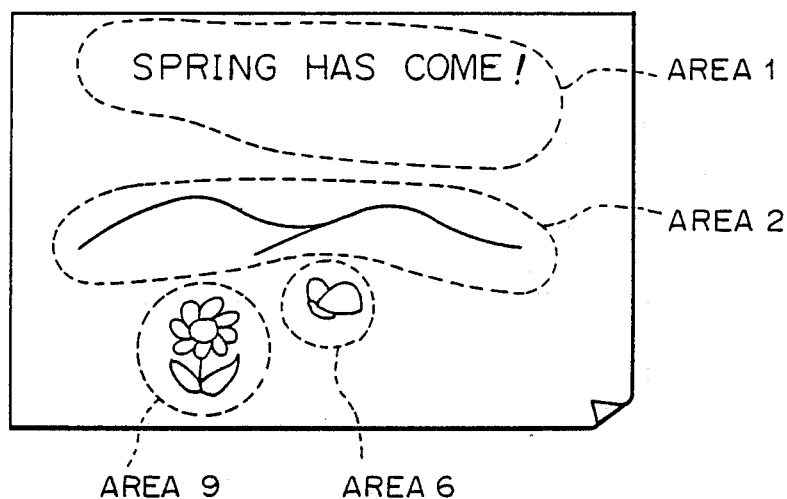
FIGS. 7a to 7c are views explaining the structure of the picture data and the management of the blocked areas, which are controlled in the image data processing system shown in FIG. 1.
Figure 7B:
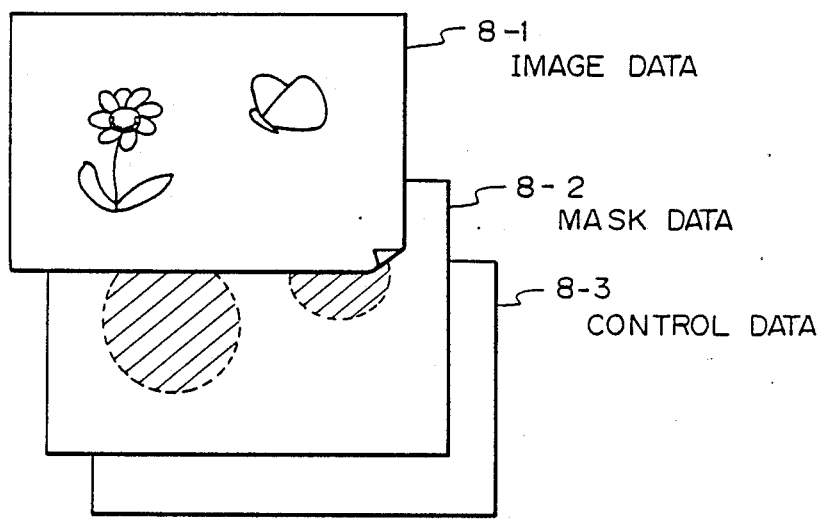
Figure 7C:
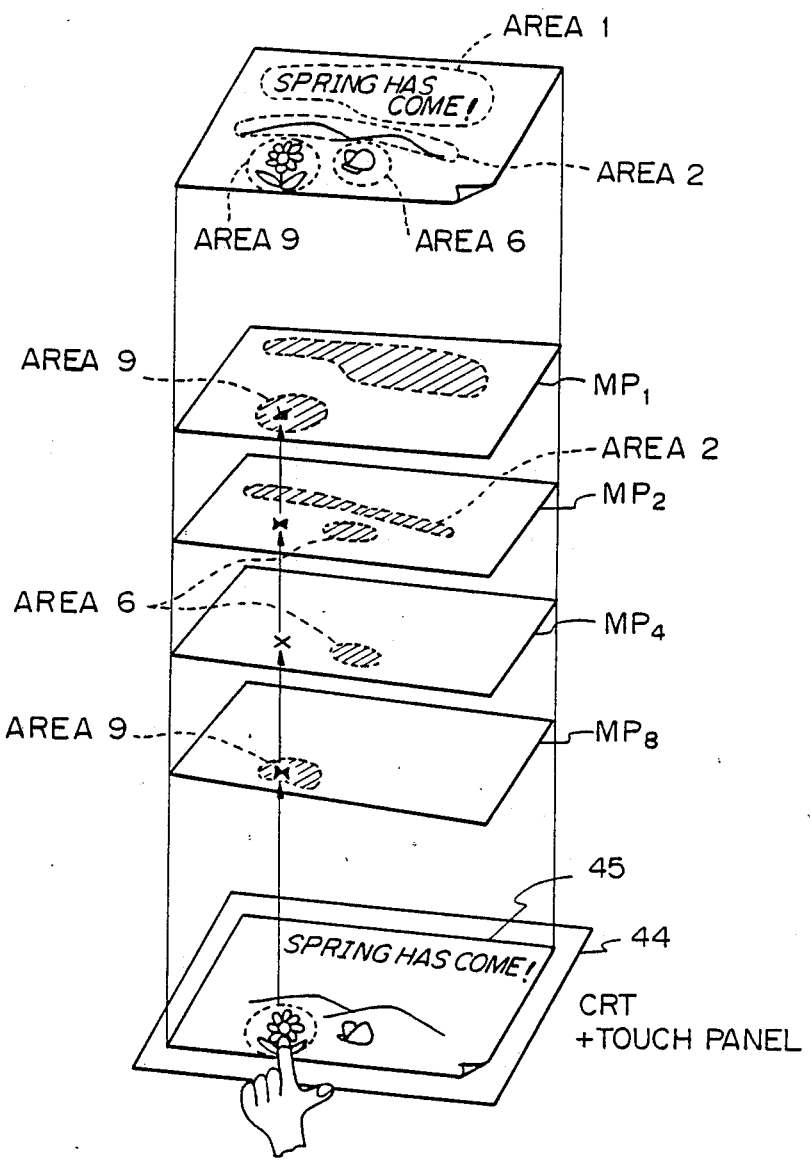

FIGS. 7a to 7c show image data to be blocked, a relationship among an image data 8-1, a mask data 8-2, and a control data 8-3, and a management of the blocked areas. In FIG. 7c, four mask plane $MP_1$, $MP_2$, $MP_4$ and $MP_8$ are provided and correspond to the following bits:

TABLE A

| BIT | MASK PLANE |
|---|---|
| 0 ($2^0$) | $MP_1$ |
| 1 ($2^1$) | $MP_2$ |
| 2 ($2^2$) | $MP_4$ |
| 3 ($2^3$) | $MP_8$ |

Accordingly, AREA 9 is specified by designating bit data of "1001".

Figure 8:
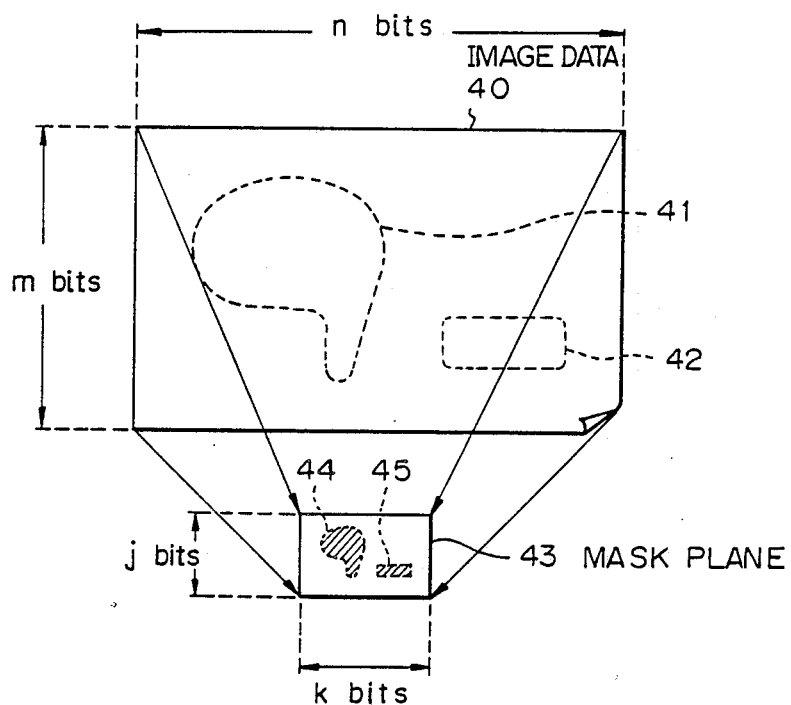
FIG. 8 is a view illustrating a reduction of mask data in FIG. 1.

To reduce the size of required memory, the mask plane can be compressed as shown in FIG. 8. The image data has a capacity of m bits $\times$ n bits, and the mask plane is reduced to a size of j bits $\times$ k bits where $j < n$ and $k < n$. The original resolution of the image data, per se, should be maintained, since the mask plane can be reduced without an adverse affect on the resolution of the image processing.

Stacking of image data will now be described with reference to FIG. 9.

Figure 9:
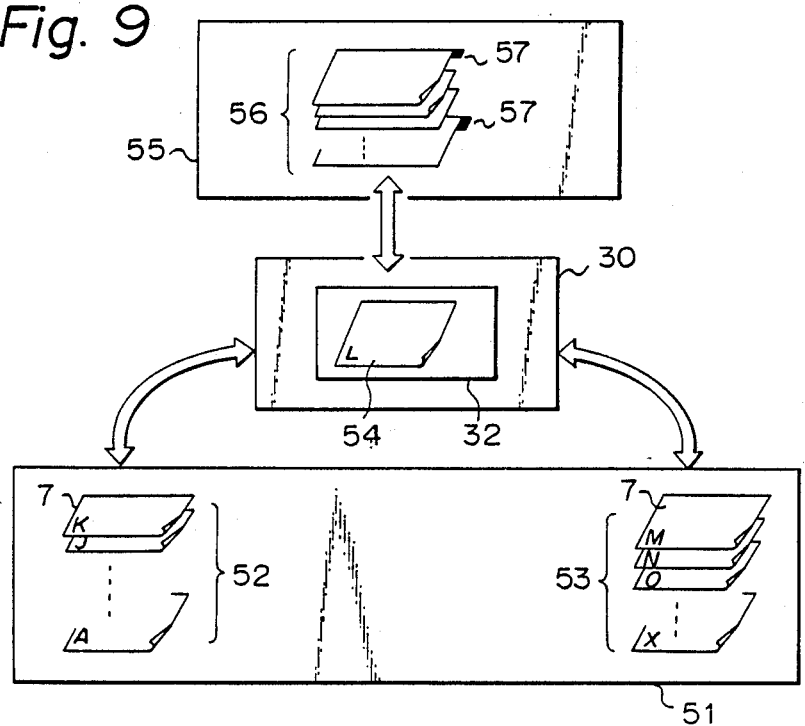
FIG. 9 is a diagram explaining a stack in the image information processing system shown in FIG. 1.

In FIG. 9, reference 51 indicates a display data storage portion, 52 and 53 are picture data groups to be displayed, 54 an image data being stored in the video memory 30 of FIG. 2 and displayed on the CRT 32, 55 a stack, 56 stacked picture data groups, and 57 is tag data. The display data storage portion 51 and the stack 55 occupy a part of the frame memory 34 of FIG. 2. Data transfer between the display data storage portion 51 and the video memory 30, and between the stack 55 and the video memory 30, can be carried out through the high-speed bus 27 shown in FIG. 2.

Figure 10:
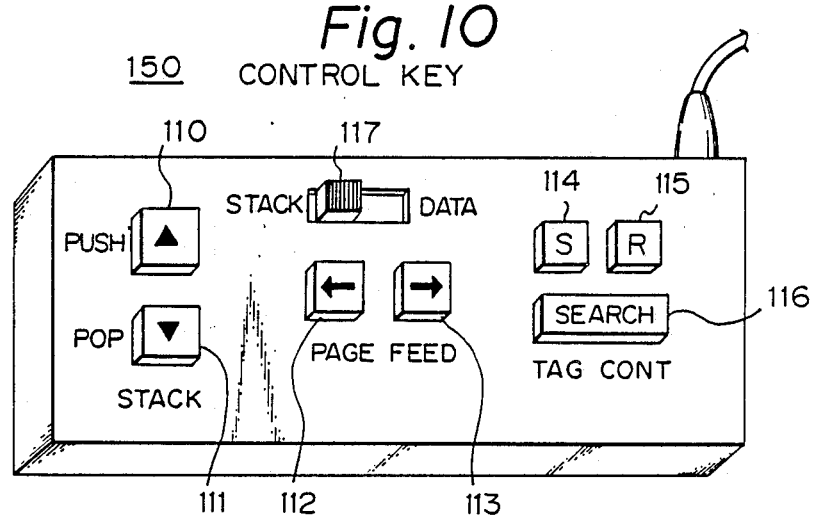
FIG. 10 is a view of a display control key used for the stack in FIG. 9.

FIG. 10 shows display control keys 150. The display control keys 150 include a push-down key 110, a pop-up key 111, page feed keys 112 and 113, a set key 114 used for tag control, a reset key 115 used for the tag control, a search designation key 116 used for the tag control, and a mode control key 117.

Figure 11:
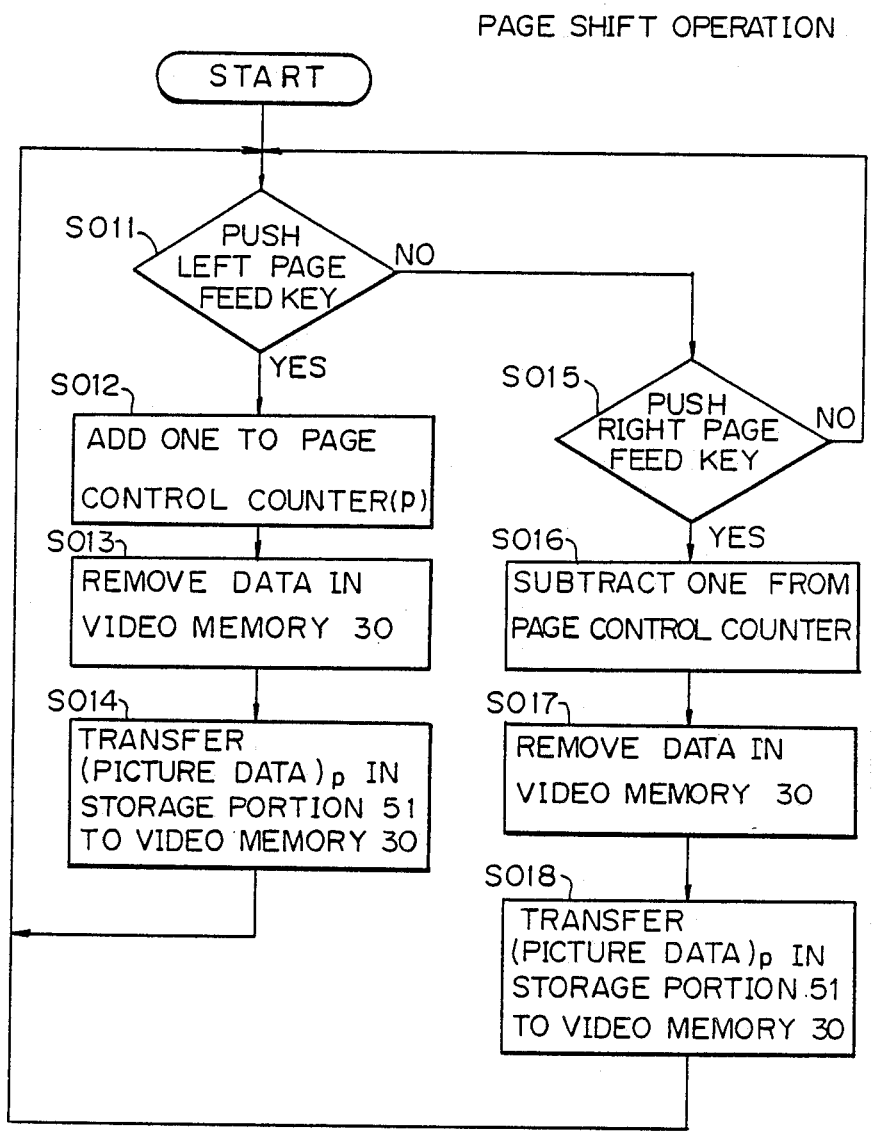
FIGS. 11 and 12a to 12c are flow charts explaining the stack operation.

Referring back to FIG. 9 and to FIG. 11, the picture data are previously programmed and grouped in a sequence of A, . . . , J, K, L, M, N, O, . . . , X, and stored in the display data storage portion 51 as the picture data groups to be displayed. The picture data group L is transferred to the video memory 30 and displayed on the CRT 30. If the left-side page feed key 112 is operated (S011), the picture data group L is removed (S013) from the video memory 30, but still remains in the display data storage 51 as a neighbour of a next picture data group K. The picture data group M is then transferred (S014) to the video memory 30 and displayed on the CRT 32. The picture data groups can be consecutively paged through the CRT 32. Similarly, a page feed in the opposite direction can be effected by operating (S013) the right-side page feed key 113. The CPU 21 controls the above operation. The entire page shift operation is shown in FIG. 11.

Figure 12A:
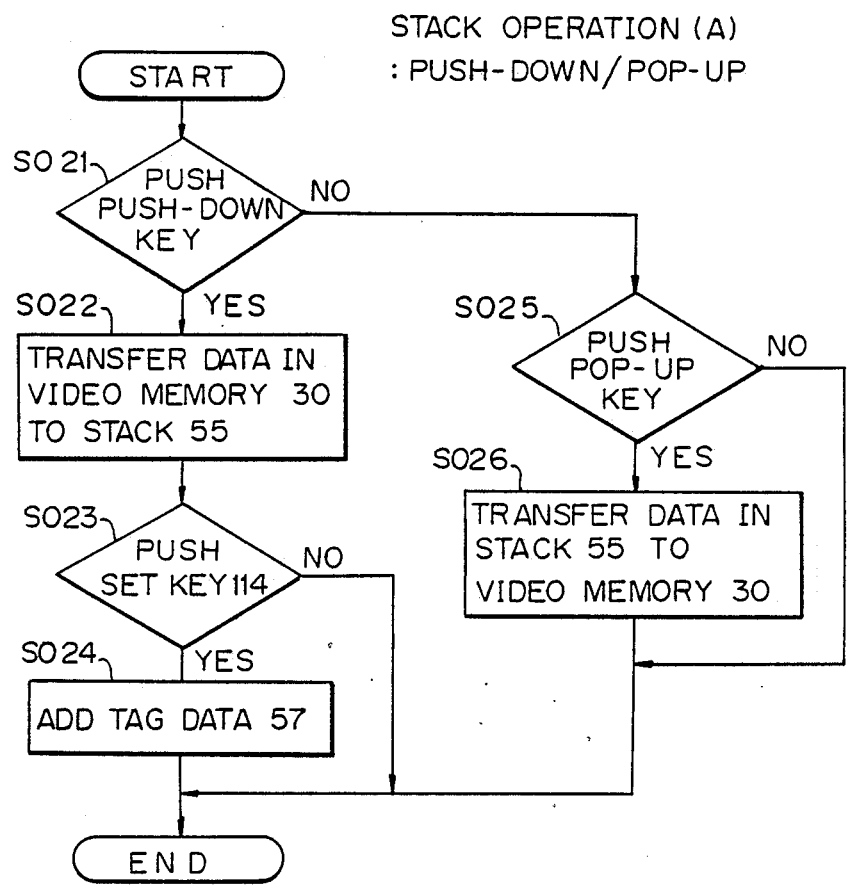
Figure 12B:
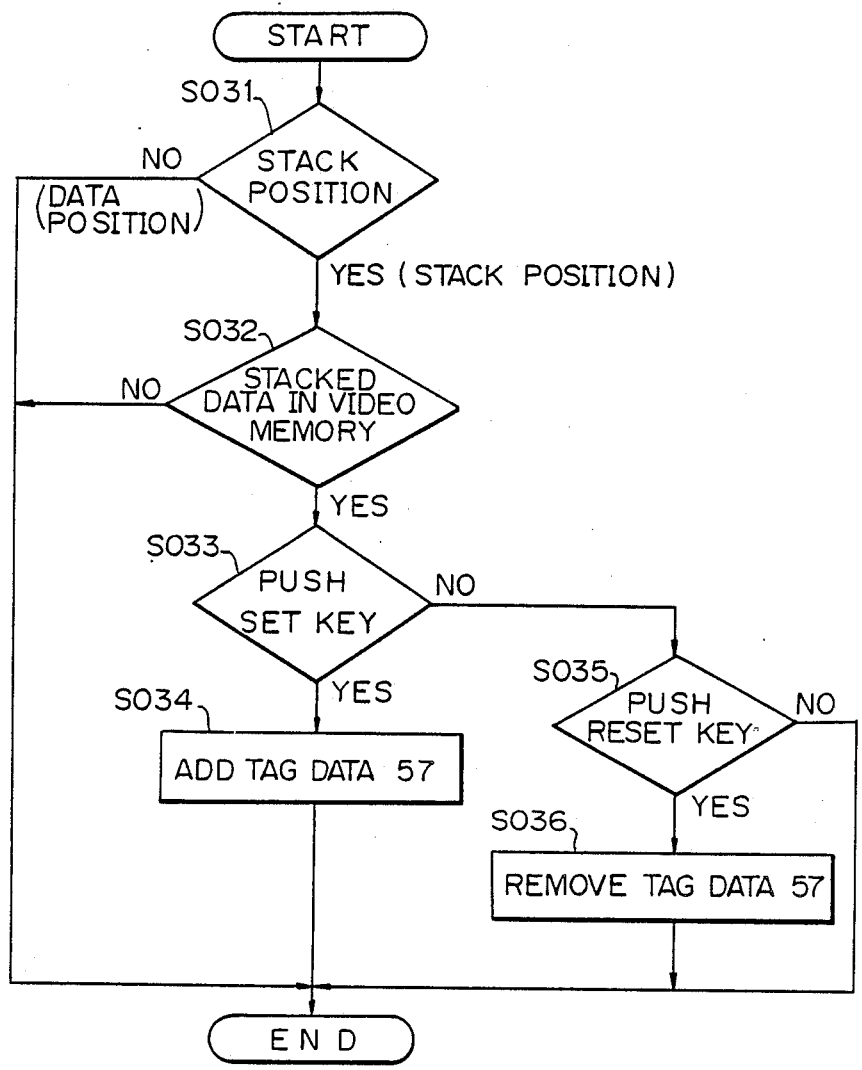
Figure 12C:
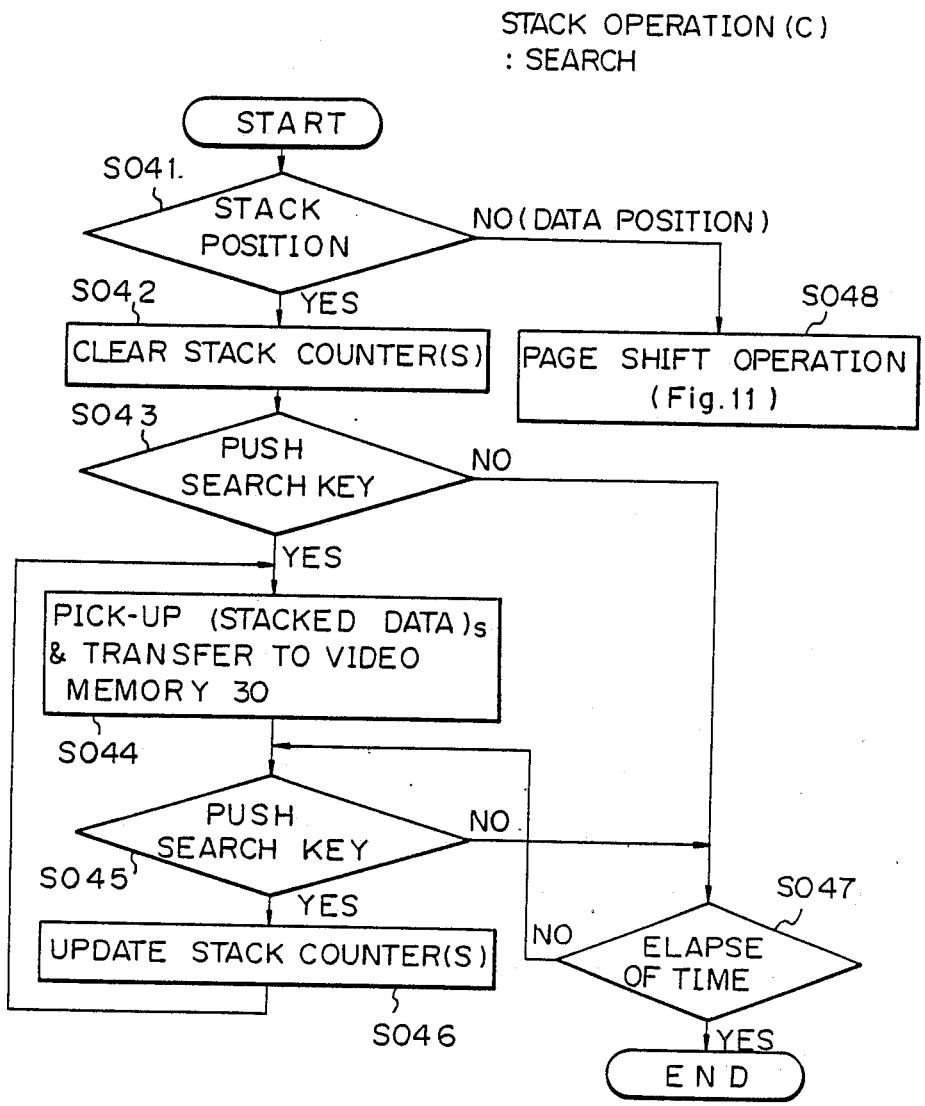

In FIGS. 12(a)-12(c) to extract desired image data and/or rearrange the image data, a stack function is provided. The stack 55 is constructed in the frame memory 34, and address management is achieved by the CPU 21. If the push-down key 110 is operated (S021), the picture data group displayed on the CRT 32 and stored in the video memory 30 is transferred (S022) to the stack 55 in the frame memory 34 through the high-speed bus 27. If the pop-up key 111 is operated (S025), the data in the stack 55 is transferred (S026) to the video memory 30 through the high-speed bus 27. Tag data 57 can be added (S024 or S034) to the stacked picture data group in the stack 55 by operating (S023 or S033) the set key 114. A tagged and stacked picture data group can be found and displayed (S044) by operating (S045) the search key 116. The tag 57 can be removed (S036) from the tagged picture data group by operating (S035) the reset key 115. When the mode control key 117 is placed at the STACK position, the stacked picture data groups can be displayed on the CRT 32 in response to the operation of the page feed key 112 or 113. When the mode control key 117 is placed at the DATA position, the picture data groups in the display (S048) data storage portion 51 can be displayed in response to the operation of the page feed key 112 or 113. The entire stack operation is shown in detail in FIGS. 12a to 12c.

Figure 13:
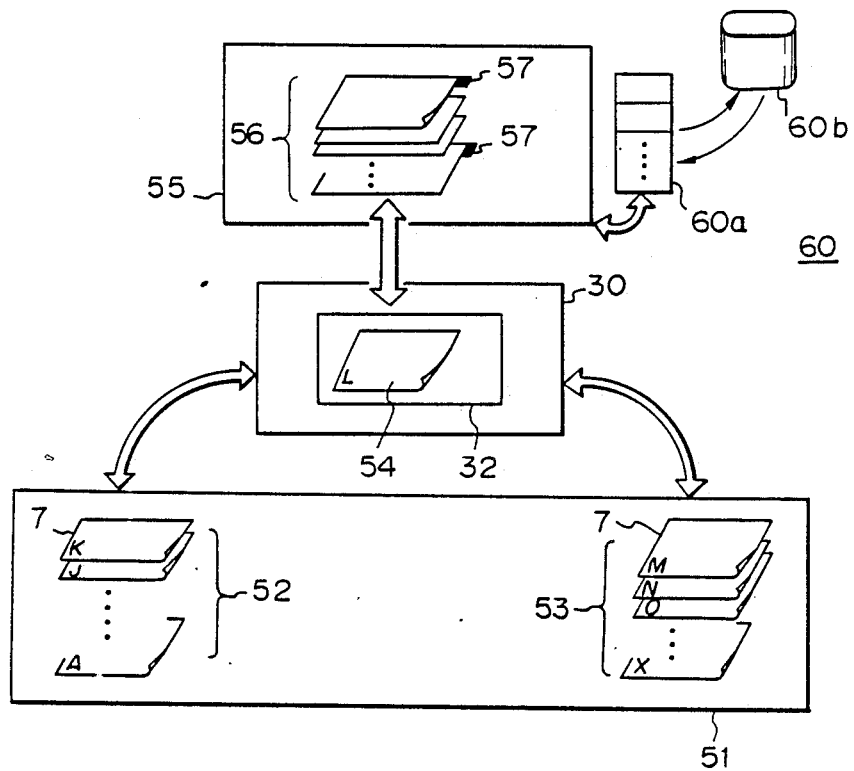
FIGS. 13 and 14 are diagrams explaining stacks modified as compared to the stack shown in FIG. 9.

A modification of the stack processing will be described. FIG. 13 shows an improved structure for processing the stack. In FIG. 13, a stack set 60 consisting of a virtual stack 60a and a secondary storage file 60b is added to the stack structure shown in FIG. 9. Stacked picture data can be transferred between the stack set 60 and the stack 55. The provision of the stack set 60 enables an additional stack to be obtained in response to a request during a sequential display of the image data.

As described above, the display data storage portion 51 and the stack 55 occupy portions in the frame memory 34 of FIG. 2. The virtual stack 60a also occupies a portion in the frame memory 34, but the secondary storage file 60b occupies a portion in the high-speed image data-base portion 4 of FIG. 2.

The stack set 60 stores stack data removed from the stack 55 and frequently reused. The designation for storing this data is effected by the user. The virtual stack 60a can hold several pieces of this data. The secondary storage file 60b can hold a large amount of this data. If display of this data is required, the data stored in the virtual stack 60a, if any, is promptly used as the stack data. When that data is stored in the secondary storage file 60b, that data is transferred to the frame memory 34 and used as the stack data.

Figure 14:
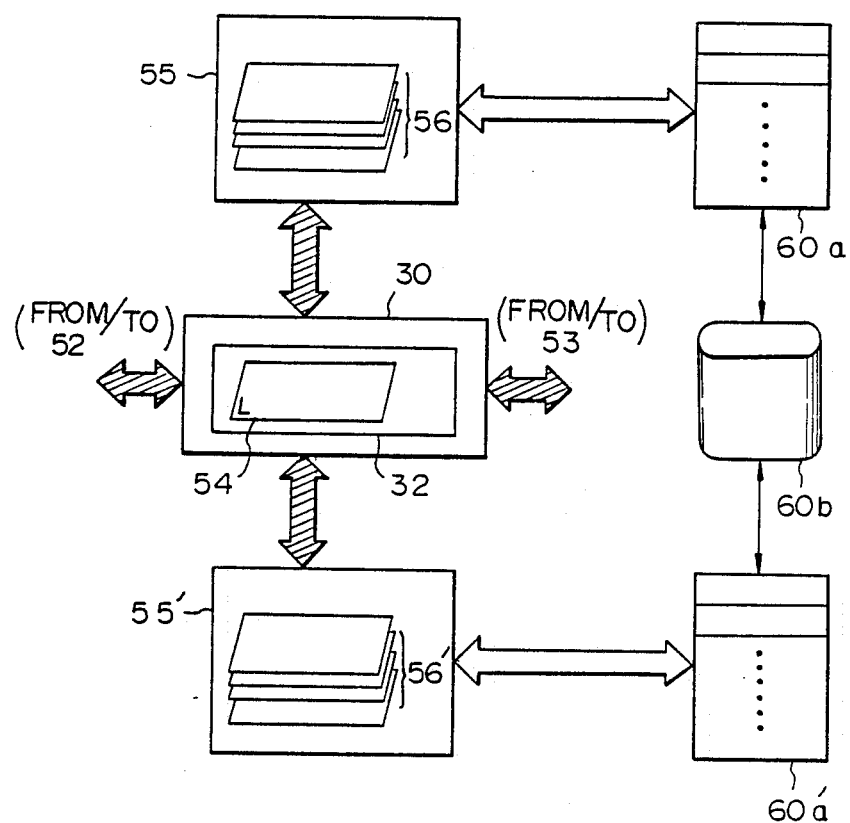

A further modification of the stack processing will be described with reference to FIG. 14. In FIG. 14, an additional virtual stack 60a' which occupies a part of push-down frame memory 34 is provided. The virtual stack 60a stores the stack data concerning the push-down; the virtual stack 60a' stores pop-up stack data; and the secondary storage file 60b is commonly used.

Figure 15:
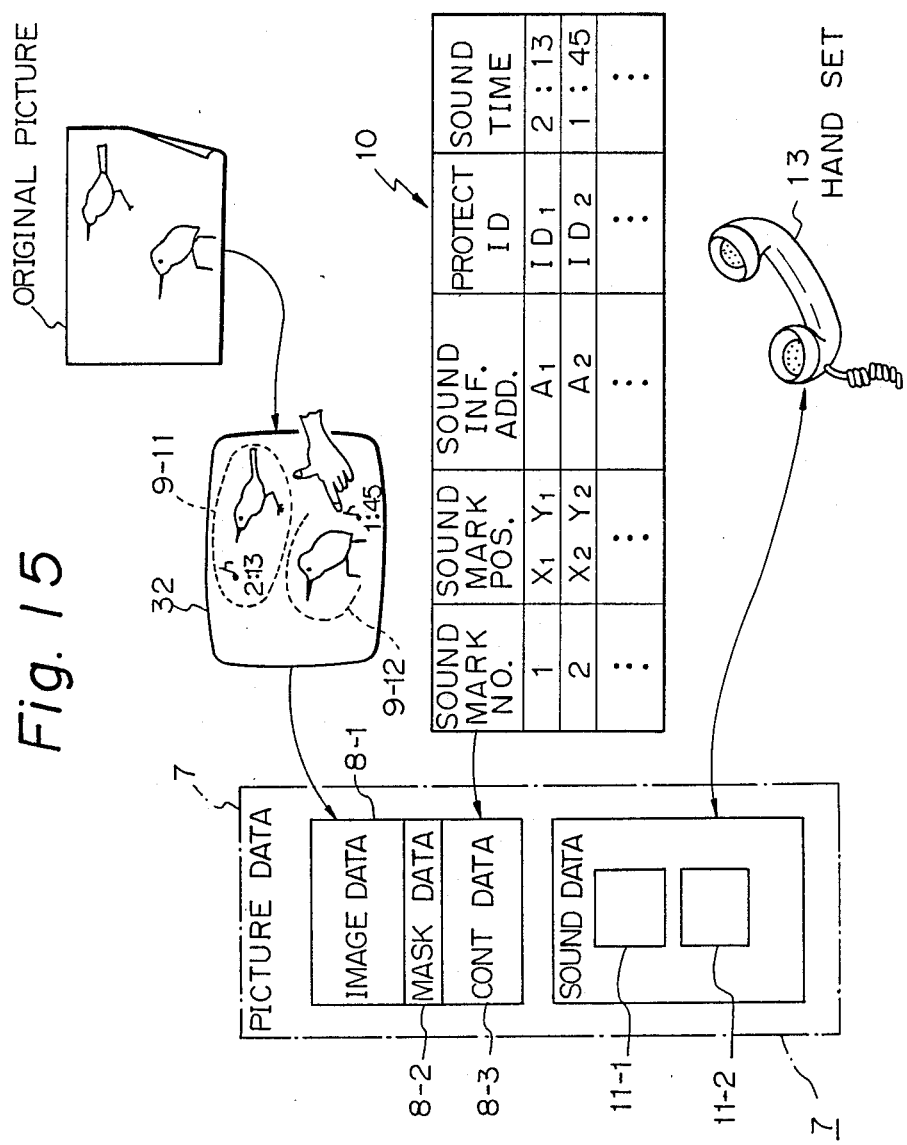
FIG. 15 is a diagram explaining a sound addition performed in the image information processing system shown in FIG. 1.

A sound-added image data processing will be described with reference to FIGS. 15 and 16. In FIG. 15, sound data can be added together with areas 9-11 and 9-12. A sound data table 10 is included in the control data 8-3. Sound data 11-1 and 11-2 are added as a part of the picture data 7. In the sound data table 10, a sound mark number column (SOUND MARK NO.) designates numbers of the sound data 11-1 and 11-2, a sound mark position column (SOUND MARK POS.) indicates positions at which a sound mark is displayed in the areas 9-11 and 9-12 on the CRT 32, a sound information address column (SOUND INF. ADD.) indicates addresses stored in the sound data 11-1 and 11-2, a protection identification column (PROTECT ID) indicates protection codes (inhibition) to inhibit an output for sound of identified areas, and a sound time column (SOUND TIME) represents times at which sound is output. Reference 13 denotes a handset for the input and output of sound.

When the image data previously blocked as the areas 9-11 and 9-12 by the "area blocking" is displayed, the user designates the area 9-12 through the touch panel 33 and inputs sound through the handset 13. The sound data 11-2 and the sound data table 10 are generated in accordance with the input sound. Thereafter, when the image data is displayed, the sound mark(s) is also displayed in a corresponding area together with the image data. If the user designates the area by touch, the corresponding sound is output through the handset 13 in accordance with the generated sound data 11-2 and the sound data table 10.

Figure 16:
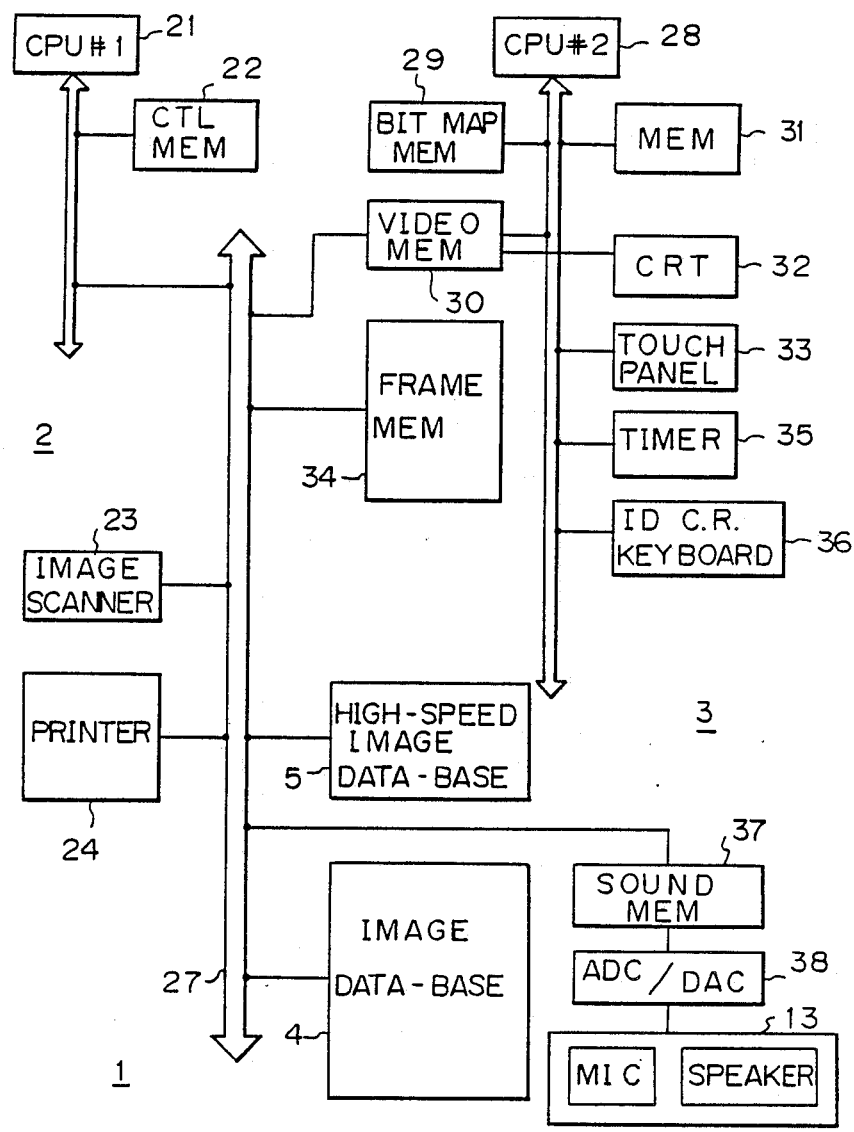
FIG. 16 is a block diagram of the image information processing system which performs the sound addition.

To carry out the above function, as shown in FIG. 16, the image processing system further includes a sound memory 37 and an analog-to-digital and digital-to-analog converter (ADC/DAC) 38 connected to the hand-set 13 having a microphone and a speaker. The memory 31 includes a sound edit program for inputting sound and generating the sound data table 10.

Figure 17:
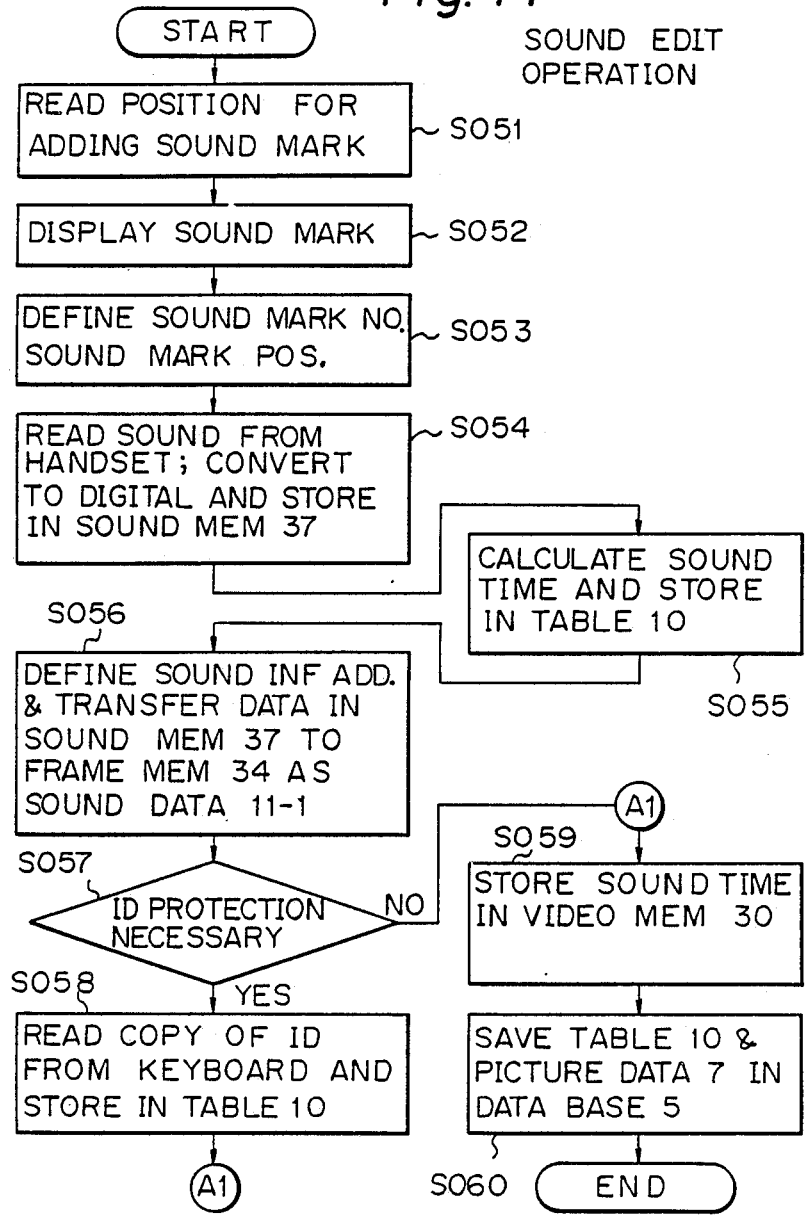
FIG. 17 is a flow chart explaining a sound edit operation of FIG. 15.

The above sound edit operation will be described with reference to FIG. 17.

S051

The user starts the sound edit program stored in the memory 31. The sound edit program in the CPU 28 outputs a message for inputting sound mark position where the data sound data is added, and the user designates the position by touching a finger to the position on the touch panel 33. The sound edit program reads the corresponding position data and transfers a corresponding sound mark signal from the bit map memory 29 to an area in the video memory 30 corresponding to the read position through a raster operation.

S052

The sound edit program displays a sound mark at the designated point on the CRT 32. This means that a recording of the sound is in a read state.

S053

The sound edit program defines the sound mark number and the sound mark position in the table 10.

S054

The user inputs a sound to be stored through the hand set 13. The input sound is converted to digital at the ADC/DAC 38 and stored in the sound memory 37 as the sound data.

S055

Upon completion of the sound input, the sound edit program calculates a sound time by using the timer 35 and stores that time in the table 10.

S056

The sound edit program defines the sound information address and saves that address in the table 10.

The sound edit program transfers the data in the sound memory 37 to the frame memory 34 as the sound data 11-1 in the picture data 7.

S057 and S058

Optionally, the sound edit program displays an inquiry to determine whether or not an identification (ID) protection code for the recorded sound is needed. If requiring the ID protection, the user inputs an ID protection code through the ID card reader keyboard 36. The sound edit program reads the ID protection code and stores that code in the table 10.

S059

The sound edit program stores the sound time calculated at step S055 in the video memory 30, and displays the sound time on the CRT 32.

S060

The obtained table 10 and the picture data 7 including the sound data 11-1 are stored in the image data-base portion 5.

The above operations can be stored.

Figure 18:
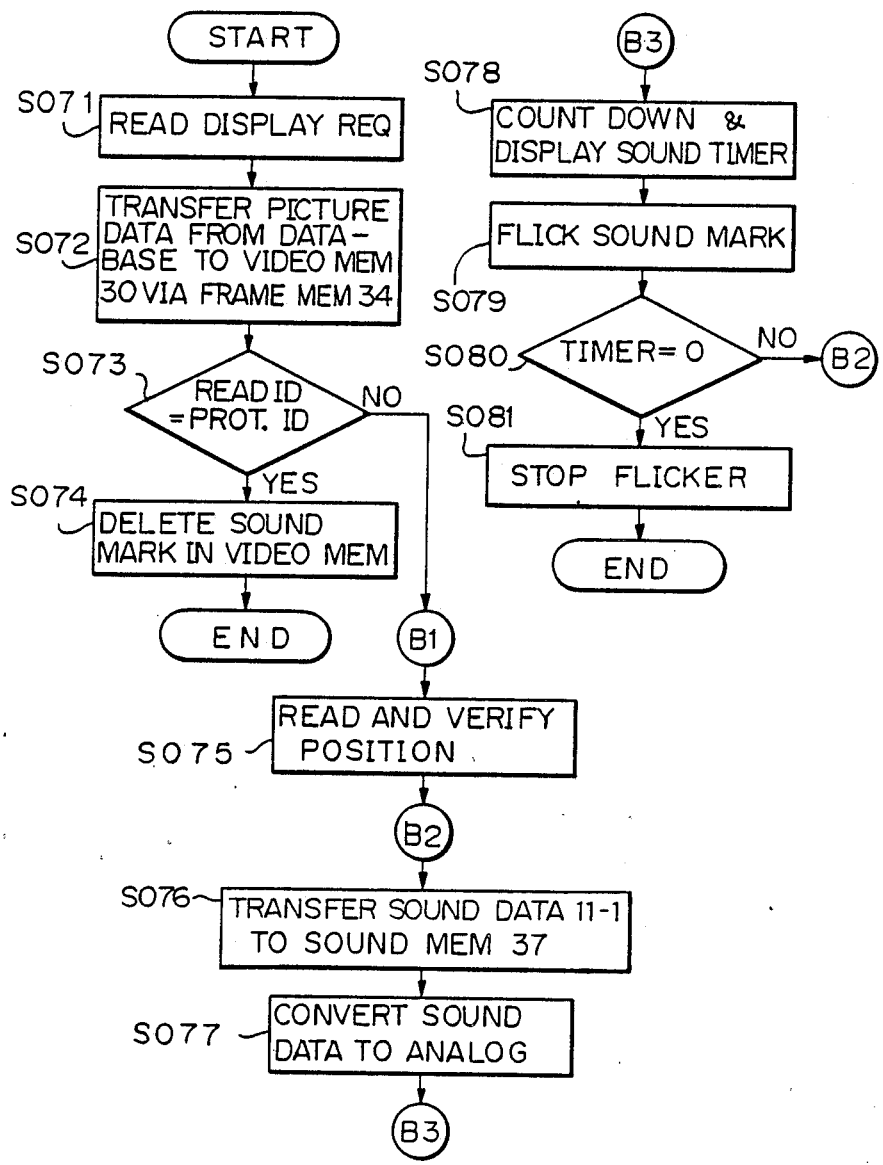
FIG. 18 is a flow chart explaining sound reproduction.

Next, sound reproduction will be described with reference to FIG. 18.

S071

A sound reproduction program stored in the memory 31 and executed by the CPU 28 reads the display request through the ID card reader 36.

S072

The sound reproduction program then transfers the picture data 7 and the table 10 from the image data-base portion 5 to the frame memory 34. The sound reproduction program further transfers the picture data transferred in the frame memory 34 to the video memory 30 in response to the display request from the read ID card.

S073 and S074

The sound reproduction program compares the ID code from the ID card with the ID protection code stored in the table 10, deletes the sound mark signal in the video memory 30 to eliminate the sound mark on the CRT 32 and to inhibits access to the display when coinciding.

S073 and S075

Otherwise, the sound mark is displayed on the CRT 32 together with other data. This indicates that the user can access the sound mark.

If requiring sound reproduction, the user touches the position where the sound mark is displayed. The sound reproduction program reads the touched position and verifies the validity of the position designation.

S076

The sound reproduction program confirms the availability of the reproduction, and then transfers a corresponding sound data 11-1 stored in the frame memory to the sound memory 37 through the high speed bus 27.

S077

The data stored in the sound memory 37 is converted to analog at the ADC/DAC 38 and output as sound through a speaker in the handset 13.

S078 and S079

The sound reproduction program counts down the sound timer in the video memory to display a remaining sound time.

The sound reproduction program starts to flicker the sound mark in the display.

S080

The above operations of steps S076 to S079 are repeated until the sound timer count reaches zero.

S081

When the sound timer count reaches zero, the sound reproduction program stops the flicker of the sound mark.

Figure 19:
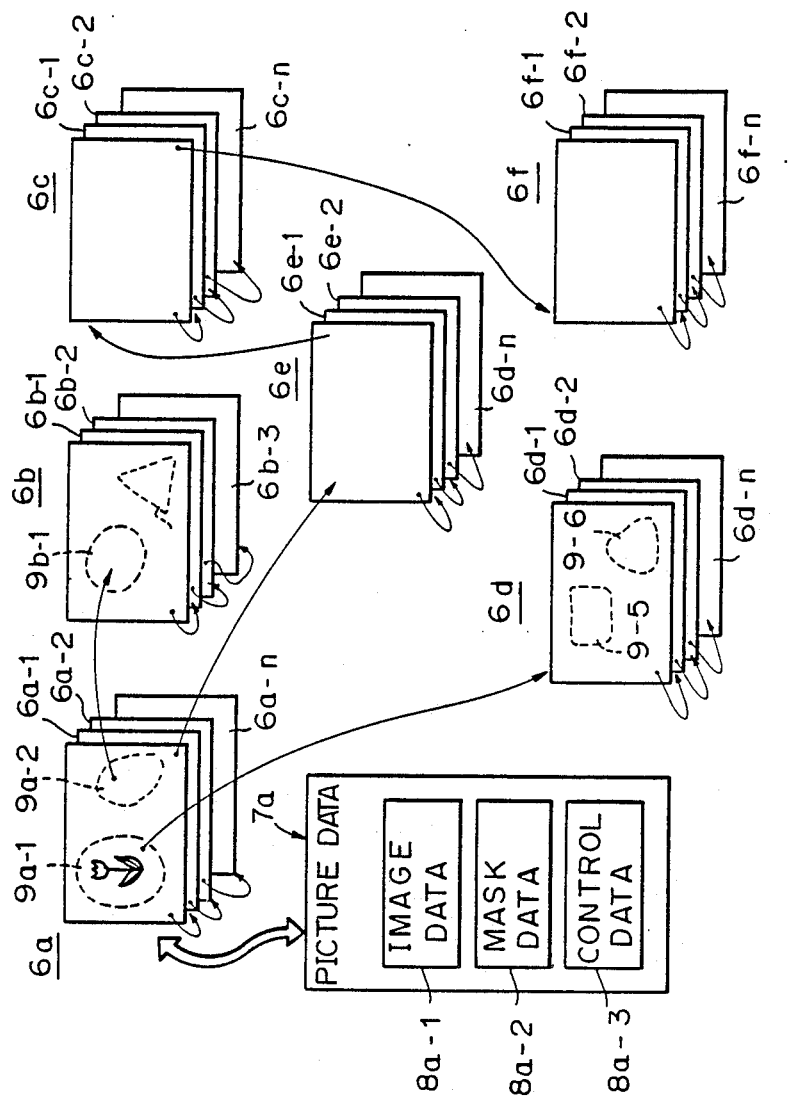
FIG. 19 is a diagram explaining a linkage which is performed in the image information processing system shown in FIG. 1.

The linkage of the picture data or the programmed picture data processing will be described in connection with FIG. 19. FIG. 19 shows a plurality of image data groups 6a to 6f. Each image data group, for example, 6a, consists of a plurality of image data 6a-1 to 6a-n. Also, a plurality of picture data exists corresponding to each image data group. In FIG. 19, only the picture data 7a corresponding to the image data group 6a is shown. Each image group, for example, 6a, is previously area blocked as areas 9a-1 and 9a-2. The image data groups and the blocked areas are then linked together. The linkage is classified into two parts: a link between each image data group, for example, between the image data 6a-1 and 6a-2, and a link between the image data groups, for example, between the image data 6a-1 and the image data 6d-1 or between the area 9a-2 and the area 9b-1. The former is called "vertical direction linkage", and the latter is called "lateral direction linkage". To define the linkage, the control data, for example, 8a-3, further includes an address storage portion for storing addresses of the vertical direction linkage and of the lateral direction linkage.

The linkage can be used for supplying supplemental information to the user in addition to the data which is being displayed. For example, when the image data 6a-1 is displayed, the data of area 9b-1, which is linked as a dependent data to the area 9a-2, can be displayed. The linked dependent data can be defined as secret data, and this secret data can be accessed only by authorized users.

Figure 20:
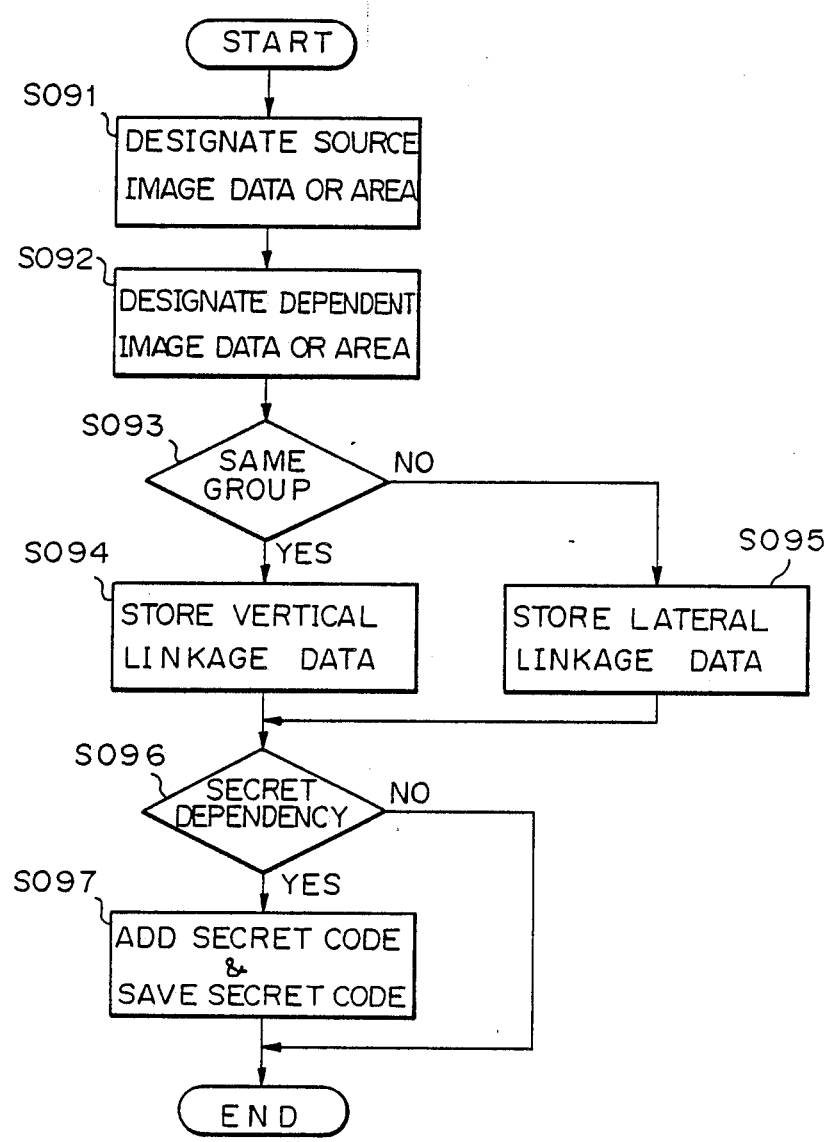
FIG. 20 is a flow chart representing a linkage definition.

FIG. 20 shows a linkage definition operation. After the data input processing and the "area blocking" the linkage definition is carried out by reading (S091, S092 and S097) source image data or source area, a dependent image data or a dependent area, to be linked and a secret information code if required, through the ID card reader 36. The linkage definition is carried out by the linkage definition program.

Figure 21:
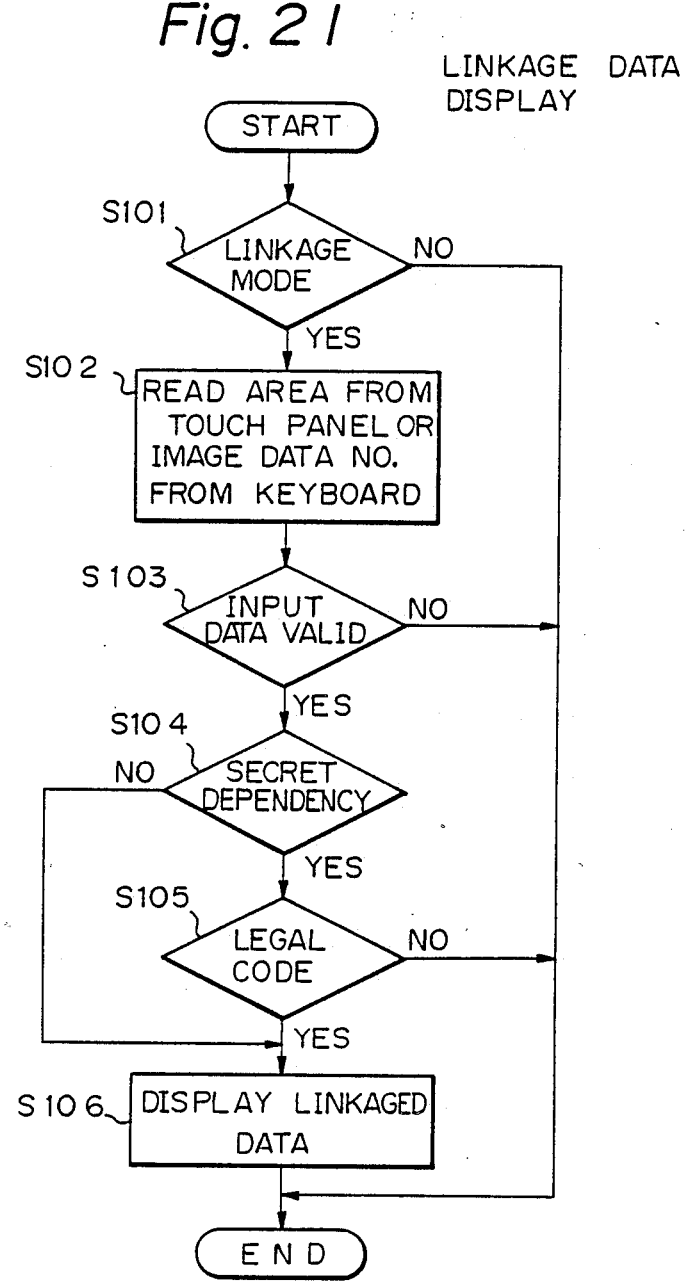
FIG. 21 is a flow chart representing a linkage data display.

FIG. 21 shows a linkage data display operation. The linked data display of, for example 6e-1 FIG. 19, can be carried out during display of the source data, for example, 6a-1. When the user changes the mode from display to linkage, by the keyboard 36, and touches the area 9a-2 on the CRT 32, a linked data display program reads the position on the touch panel (S102). The linked data program checks the validity of the input data. If the linkage is not defined, the linked data display program is terminated (S103). If the linkage is valid, the linked data display program further checked whether or not a secret dependency exists (S104). If the secret dependency exists, the linked data display program reads a code from the keyboard and checks whether or not it is legal (S105). If the code is illegal, the linked data display is not effected. If the code is legal, the linked data of the area 9b-1 is displayed (S106).

Similarly, a linked data display for the image data 6e-1 can be carried out.

Figure 22:
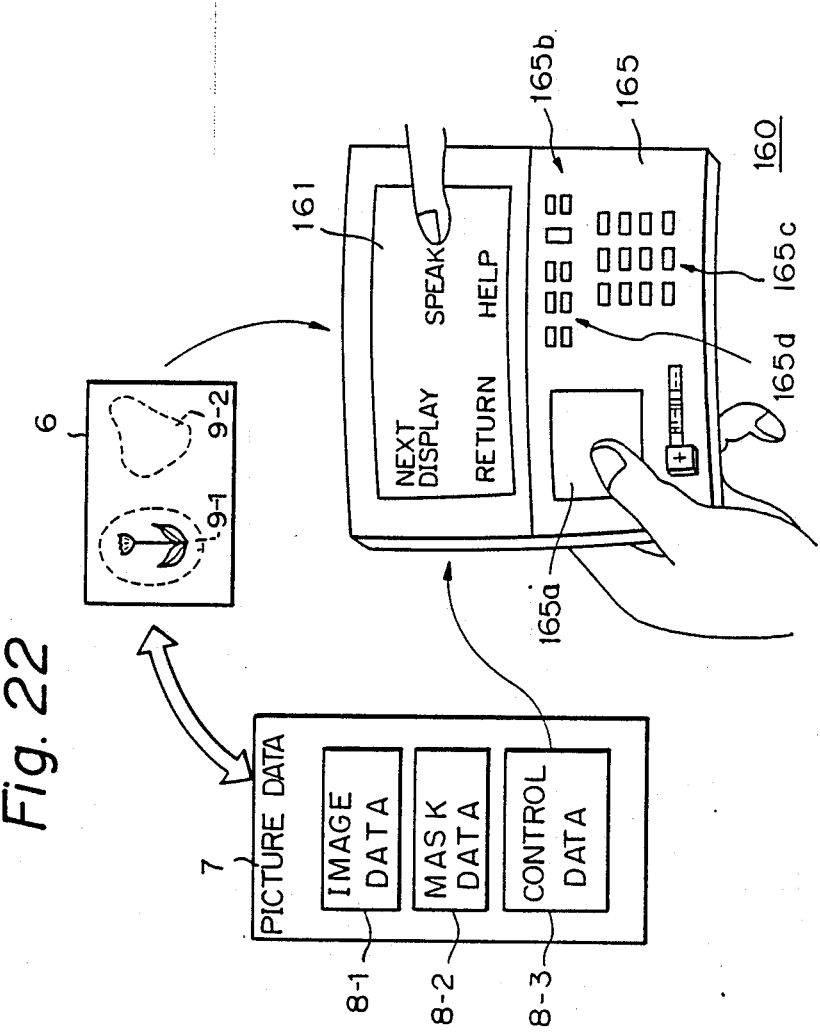
FIG. 22 is a diagram illustrating the operation when using a portable key.
Figure 23:
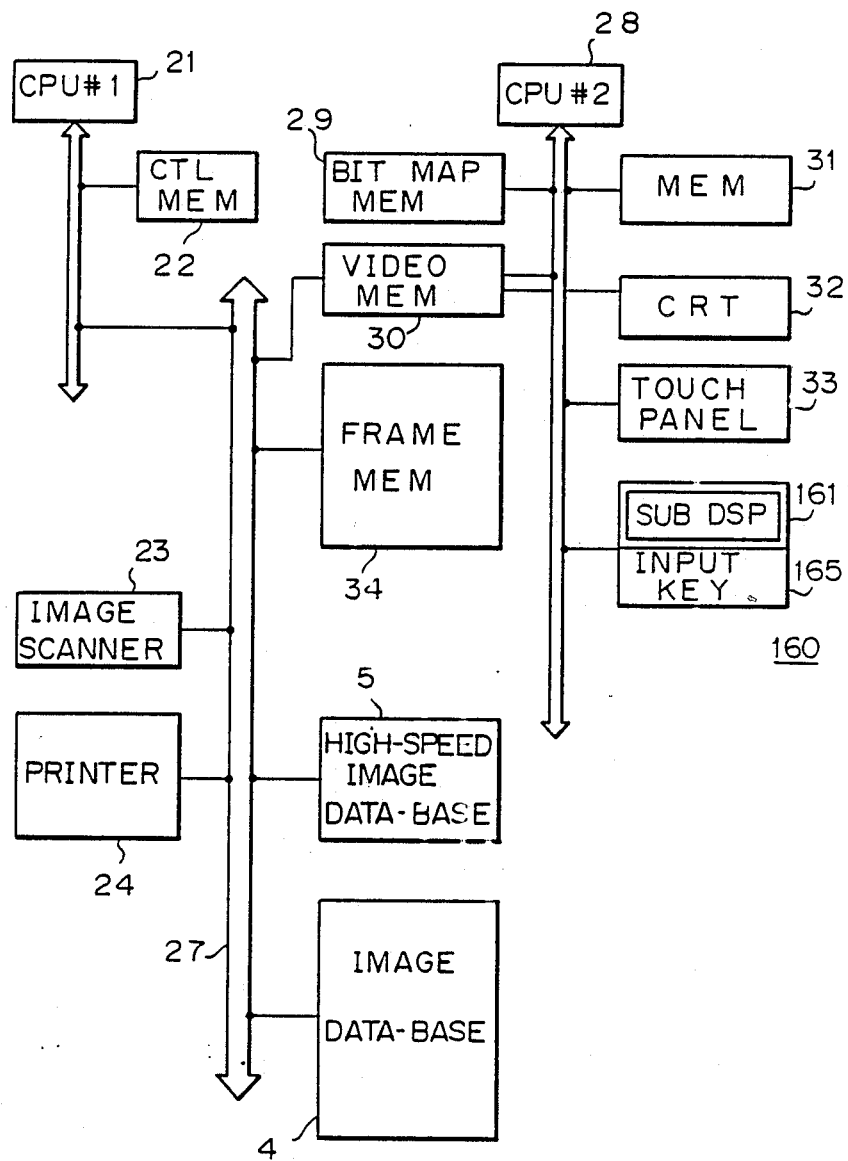
FIG. 23 is a block diagram of an image information processing system connected to the portable key shown in FIG. 22.

To improve the ease of operation by the user, a portable key unit 160 is provided as shown in FIGS. 22 and 23. The portable key unit 160 includes a sub display portion 161 composed of a Liquid Crystal Display (LCD) and an input key unit portion 165. The portable key 160 is connected to the CPU 28, FIGS. 2 and 16.

The sub display portion 161 can be used as the SUB DISPLAY shown in FIG. 5. Also, the input key portion 165 can be used as the KEY shown in FIG. 5.

The display portion 161 can display words such as "NEXT DISPLAY", "SPEAK", "RETURN", "HELP". The input key portion 165 includes a designation key 165a, a mode key portion 165b, a ten key portion 165c and a control key portion 165d. The designation key 165a can be used for designating a command corresponding to a message displayed on the display portion 161. The mode key portion 165b includes mode change keys such as "STACK/DATA", shown in FIG. 10, and "LINKAGE" for linking the image data as described above. The ten key portion 165c can be used for designating the linkage area or image data, and inputting the secret code, etc. The control key portion 165d includes the "PAGE FEED" keys shown in FIG. 10, the "PUSH-DOWN" key, the "POP-UP" key, the "TAG CONTROL" key, etc. The display portion 161 of the portable key unit 160 provides the user with messages for operating the image processing system in a simple form. The input key portion 165 includes a variety of keys necessary for easily operating the image processing system or designating various information, except for directly designating the position on the CRT by the touch panel.

The provision of the portable key unit 160 together with the touch panel provides good man-machine communication, and the CRT 32 can be used for this man-machine-communication.

To realize the above operation with a high speed and economy, as shown below in Table 1, a memory system is given a hierarchical structure.

vides a high data compression, for example, approximately 1/10 to 1/20. But the MH/M$^2$R coding needs a long coding time, for example, approximately 1 sec for compressing the image data on a sheet of 210 mm×297 mm.

The high-speed compressable image data can be coded by, for example, King Fisher fix length compression coding (KF coding). The KF coding provides a medium data compression, for example, approximately 1/5. The KF coding can code the image data at a considerably high speed, for example, 35 msec for compressing the image data on a sheet 210 mm×297 mm. The KF coding will be briefly described. The KF coding processes an original data for every byte of data (eight bit data) and expresses the byte data by a byte status (BS) of two bits, as shown in Table 2.

TABLE 2

| BS | CONTENT |
|---|---|
| 00 | all white |
| 10 | all black |
| 01 | mixed with white and black |
| 11 | control code |

When white and black are mixed, original data is added to the code "01" as an information byte (IB).

An example of the KF coding is shown below:

TABLE 3

| ORIGINAL DATA | 00000000 | 11111111 | 00000000 | 01100101 |
|---|---|---|---|---|
| BS | 00 | 10 | 00 | 01 |
| IB | | | | 01100101 |
| KF CODED DATA | 00100001, | 01100101 | | |

Referring again to FIG. 2, the data which is input and processed by, for example, rotation or filtering, at the data input processing portion 2 is highly compressed and stored in the image data-base portion 4. The data stored in the image data-base portion 4, which is needed for the response to the user requests, is converted into high-speed compressable image data and transferred to the high-speed image data-base portion 5. Further, the data transferred in the high-speed image data-base portion 5 and needed for an output in response to a user request, and having a capacity of one frame for display, is converted to a non-compressed image data and stored in the frame memory 34. The data transferred to the frame memory 34 is then transferred to the video memory 30 and displayed on the CRT 32. The above data transfers are carried out through the high speed bus 27.

The frame memory 34 can be realized by a static RAM, or a dynamic RAM, or the like. The high-speed image data-base portion 5 can be realized by a magnetic disc system. The image data-base portion 4 can be realized by an optical disc memory system. The optical memory system can be a read-only-type, a write-once-

TABLE 1

| | FRAME MEMORY | HIGH-SPEED IMAGE DATA-BASE | IMAGE DATA-BASE |
|---|---|---|---|
| SPEED | FAST | MIDDLE | LOW |
| CAPACITY | SMALL (FRAME SIZE) | MIDDLE | LARGE |
| IMAGE DATA FORMAT | NON-COMPRESSED IMAGE DATA FOR CURRENT USE | HIGH-SPEED COMPRESSABLE IMAGE DATA | HIGHLY COMPRESSED IMAGE DATA |

In Table 1, the highly compressed image data can be coded by, for example, MH coding and M$^2$R coding, both defined by CCITT. The MH/M$^2$R coding protype and/or a readable and writable-type, such as an optical magnetic disc memory system.

Many widely different embodiments of the present invention may be constructed without departing from the spirit and scope of the present invention. It should be understood that the present invention is not limited to the specific embodiments described in this specification, except as defined in the appended claims.

I claim:

1. An image information processing system having a display unit, comprising:
    data receiving means for receiving and providing image data;
    image data-base means, operatively connected to said data receiving means, for highly compressing the image data from said data receiving means and storing the highly compressed image data;
    high-speed image data-base means, operatively connected to said image data-base means, for storing data from said image data-base means in a high-speed compressed form;
    a buffer memory, operatively connected to said image data-base means and said high-speed image data-base means, storing data;
    request input means, operatively connected to said image data-base means, said high-speed image data-base means and said buffer memory, for receiving requests and outputting data in response to the requests; and
    area blocking means for blocking an area of display on the display unit and producing picture data including image data, mask data and control data in accordance with the block area.

2. An image information processing system according to claim 1, wherein said area blocking means comprises a touch panel.

3. An image information processing system according to claim 1, further comprising means for reducing the mask data at a predetermined rate.

4. An image information processing system according to claim 1, further comprising stacking means for stacking picture data displayed on the display unit in said buffer memory and removing the stacked picture data in response to one of the requests.

5. An image information processing system according to claim 4, wherein said stacking means comprises feeding means for providing picture data to be displayed on the display unit and sequentially performing a stack operation.

6. An image information processing system according to claim 5, wherein said stacking means comprises tagging means for adding a tag to and removing a tag from the stacked picture data.

7. An image information processing system according to claim 6, wherein said tagging means comprises means for searching for tagged picture data.

8. An image information processing system according to claim 4 including a stack, wherein said stacking means comprises stack storage means for storing picture data removed from the stack and frequently used in the stack.

9. An image information processing system according to claim 1, further comprising sound adding means for adding sound information corresponding to displayed pictured data and a designated position displayed on the display unit, the sound information including a sound mark to be displayed and sound.

10. An image information processing system according to claim 9, wherein said sound adding means comprises a sound input unit operatively connected to said image data base means.

11. An image information processing system according to claim 9, further comprising:
    a touch panel connected to the display unit; and
    designating means for generating the designated position on the display unit via the touch panel.

12. An image information processing system according to claim 9, wherein said sound adding means comprises means for adding a protection code to the sound information, preventing an illegal request for an output of sound.

13. An image information processing system according to claim 9, wherein said sound adding means comprises means for providing an output of the sound information corresponding to the displayed picture data, said output comprising a display of the sound mark at the designated position and the sound.

14. An image information processing system according to claim 13, wherein said sound adding means comprises means for inhibiting the output of the sound information responsive to an illegal request.

15. An image information processing system according to claim 13, wherein said sound adding means comprises a sound output unit connected to the display unit.

16. An image information processing system according to claim 1, including groups of the image data and further comprising:
    linking means for providing a link between the image data in a same group, between the image data in different groups, between blocked areas of the image data in a same group, between blocked areas of the image data in different groups, between a blocked area of the image data and image data in a same group, between a blocked area of the image data and image data in different groups and for providing linked data, said linking means defining a blocked area as image data responsive to one of the requests.

17. An image information processing system according to claim 16, wherein said linking means comprises means for adding a secret code to the linked data.

18. An image information processing system according to claim 16, wherein said linking means comprises linked data output means for providing an output of the linked data responsive to display data.

19. An image information processing system according to claim 18, wherein said linked data output means comprises means for prohibiting the output of the linked data when a recorded secret code does not coincide with an input request secret code.

20. An image information processing system according to claim 1, further comprises:
    a key unit connected to the display unit and including:
    a display portion displaying auxiliary messages in response to an operation request; and
    an input key portion including mode selection keys, control keys, data input keys, and demand keys connected to said request input means and inputting data.

21. An image information processing system according to claim 1, wherein said image data-base means, said high-speed image data-base means and said buffer memory comprise a hierarchical structure, said image data-base means comprising a low-speed and large capacity memory device, said high-speed image data-base means comprising a middle speed and middle capacity memory device, and said buffer memory comprising a high-speed and small capacity memory device.

22. An image information processing system according to claim 21, wherein said image data-base means stores highly compressed data, said high-speed image data-base means stores high-speed compressed data, and said buffer memory stores data for current output from said high-speed image data-base means.

23. An image information processing system according to claim 22, wherein said image data base means comprises an optical disc memory system, said high-speed image data-base means comprises a magnetic disc memory system, and said buffer memory comprises a RAM.

24. A method for processing image information for a display such as characters, pictures and sound, comprising the steps of:
inputting image information;
providing the input image information to an image data-base and highly compressing the input image information;
inputting a request to output data;
receiving data from said image data-base in response to the request and providing the received data to a high-speed image data-base and translating the received data into a high-speed compressed form;
receiving data from said high-speed image data-base in response to the request and providing high-speed output data; and
blocking an area of the display corresponding to an output of the high-speed output data and producing and displaying picture data in accordance with the blocked area, the picture data comprising image data, mask data and control data.

25. A method according to claim 24, wherein said area blocking step includes reducing a number of bits defining the mask data at a predetermined rate.

26. A method according to claim 24, further comprising the step of stacking the displayed picture data and removing the stacked picture data from the stack.

27. A method according to claim 26, wherein said stacking step includes performing stack operations in response to a feed of the displayed picture data.

28. A method according to claim 26, wherein said stacking step includes adding and removing a tag used for searching, to and from the stacked picture data.

29. A method according to claim 24, further comprising the step of adding sound information to the picture data comprising a sound mark to be displayed and sound, the sound information corresponding to a designated position on the display.

30. A method according to claim 29, wherein said sound adding step includes adding a protection code to the added sound information preventing an illegal request.

31. A method according to claim 24, including groups of the image data, and further comprising the step of linking between the image data in a same group, between the image data in different groups, between blocked areas of the image data in a same group, between blocked areas of the image data in different groups, between a blocked area of the image data and the image data in a same group, and between a blocked area of the image data and image data in a different group, and providing linked data responsive to a request.

32. A method according to claim 31, further comprising the steps of adding a secret code to the linked data, preventing an illegal request.

* * * * *

UNITED STATES PATENT AND TRADEMARK OFFICE
CERTIFICATE OF CORRECTION

PATENT NO. : 4,954,969
DATED : September 4, 1990
INVENTOR(S) : Tomoki Tsumura

It is certified that error appears in the above-identified patent and that said Letters Patent is hereby corrected as shown below:

```
Col. 6, line 36, "<n" (first occurrence)
        should be --<m--.

Col. 7, line 32, delete "(S048);
        line 33, after "displayed" insert
            --(S048)--;
        line 65, "push-down" should be --the--;
        line 66, "the" (first occurrence)
            should be --push-down--;
        line 67, delete "down".

Col. 8, line 47, "data sound data" should be
            --sound data--;
        line 52, delete "corresponding to the";
        line 53, delete "read position".

Col. 10, line 36, after "image" insert --data--.
```

Signed and Sealed this

Tenth Day of March, 1992

*Attest:*

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,954,969
DATED : September 4, 1990
INVENTOR(S) : Tomoki Tsumura

It is certified that error appears in the above-identified patent and that said Letters Patent is hereby corrected as shown below:

Title Page Under Foreign Application Priority Data:

```
line 6, "313159159" should be --61-313159--;
line 7, "313160160" should be --61-313160--;
line 8, "313161161" should be --61-313161--;
line 9, "313162162" should be --61-313162--.
```

Signed and Sealed this

Twenty-first Day of April, 1992

Attest:

HARRY F. MANBECK, JR.

*Attesting Officer*    *Commissioner of Patents and Trademarks*